(12) United States Patent
Chen et al.

(10) Patent No.: US 12,228,977 B2
(45) Date of Patent: *Feb. 18, 2025

(54) DISPLAY METHOD FOR DEVICE HAVING FOLDABLE SCREEN AND FOLDABLE SCREEN DEVICE

(71) Applicant: Huawei Technologies Co., Ltd., Shenzhen (CN)

(72) Inventors: Xiaoxiao Chen, Nanjing (CN); Hao Chen, Shenzhen (CN); Yuyan Chu, Shenzhen (CN); Hua Jiang, Nanjing (CN); Lin Gao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,216

(22) Filed: Aug. 23, 2023

(65) Prior Publication Data

US 2023/0393631 A1 Dec. 7, 2023

Related U.S. Application Data

(63) Continuation of application No. 17/687,118, filed on Mar. 4, 2022, now Pat. No. 11,775,025, which is a (Continued)

(30) Foreign Application Priority Data

Sep. 5, 2019 (CN) .......................... 201910838420.X

(51) Int. Cl.
*G09G 5/00* (2006.01)
*G06F 1/16* (2006.01)
*G06F 3/0481* (2022.01)

(52) U.S. Cl.
CPC .......... *G06F 1/1677* (2013.01); *G06F 1/1652* (2013.01); *G06F 3/0481* (2013.01);
(Continued)

(58) Field of Classification Search
CPC .... G06F 1/1616; G06F 1/1618; G06F 1/1626; G06F 1/1641; G06F 1/1652;
(Continued)

(56) References Cited

U.S. PATENT DOCUMENTS 9,684,342 B2 6/2017 Kim et al.
10,416,720 B2 9/2019 Lee et al.
(Continued)

FOREIGN PATENT DOCUMENTS

CN 107678724 A 2/2018
CN 107678826 A 2/2018
(Continued)

*Primary Examiner* — Joe H Cheng
(74) *Attorney, Agent, or Firm* — Conley Rose, P.C.

(57) ABSTRACT

A display method for a device having a foldable screen includes: detecting a status of the foldable screen; displaying an application interface on one or more of a first screen of the foldable screen or a second screen of the foldable screen according to a first display policy if the status of the foldable screen is a support state or a folded state; or if the status of the foldable screen is an unfolded state, displaying the application interface on the foldable screen in the unfolded state according to a second display policy, where in the unfolded state the first screen and the second screen form a same plane or form an approximately same plane, and where the first display policy is different from the second display policy.

20 Claims, 19 Drawing Sheets

Related U.S. Application Data continuation of application No. PCT/CN2020/113479, filed on Sep. 4, 2020.

(52) U.S. Cl.
CPC ............... *G06F 2200/1637* (2013.01); *G06F 2203/04803* (2013.01)

(58) Field of Classification Search
CPC .... G06F 1/1677; G06F 3/0481; G06F 3/0487; G06F 3/04886; G06F 2200/1614; G06F 2200/1637; G06F 2203/04803; G09F 9/301; G09G 3/035; G09G 5/14; G09G 2354/00; G09G 2380/02; H04M 1/0214
See application file for complete search history.

(56) References Cited

U.S. PATENT DOCUMENTS

| | | | |
|---|---|---|---|
| 11,170,737 | B2 | 11/2021 | Chen et al. |
| 11,775,025 | B2 * | 10/2023 | Chen ................. G06F 1/1618 345/156 |
| 2010/0298032 | A1 | 11/2010 | Lee et al. |
| 2013/0076681 | A1 | 3/2013 | Sirpal et al. |
| 2013/0321340 | A1 | 12/2013 | Seo et al. |
| 2014/0098095 | A1 | 4/2014 | Lee et al. |
| 2014/0101578 | A1 | 4/2014 | Kwak et al. |
| 2015/0029229 | A1 | 1/2015 | Voutsas |
| 2015/0338888 | A1 | 11/2015 | Kim et al. |
| 2016/0048363 | A1 | 2/2016 | North et al. |
| 2016/0098063 | A1 | 4/2016 | Lee et al. |
| 2017/0075479 | A1 | 3/2017 | Tsukamoto |
| 2017/0075640 | A1 | 3/2017 | Chun et al. |
| 2017/0229100 | A1 | 8/2017 | Chun et al. |
| 2017/0345397 | A1 | 11/2017 | Tsukamoto et al. |
| 2018/0188774 | A1 | 7/2018 | Ent et al. |
| 2018/0188910 | A1 | 7/2018 | Ko et al. |
| 2018/0329521 | A1 | 11/2018 | Hesketh et al. |
| 2018/0356904 | A1 | 12/2018 | Disano et al. |
| 2020/0264826 | A1 | 8/2020 | Kwon et al. |
| 2020/0301641 | A1 | 9/2020 | Park et al. |
| 2020/0320906 | A1 | 10/2020 | Knarr et al. |
| 2021/0311617 | A1 | 10/2021 | Nakanishi et al. |
| 2021/0365165 | A1 | 11/2021 | Chen |
| 2022/0057866 | A1 | 2/2022 | Xu |

FOREIGN PATENT DOCUMENTS

| | | |
|---|---|---|
| CN | 107728901 A | 2/2018 |
| CN | 107765971 A | 3/2018 |
| CN | 108227897 A | 6/2018 |
| CN | 109710135 A | 5/2019 |
| CN | 109840061 A | 6/2019 |
| CN | 109889630 A | 6/2019 |
| CN | 109947315 A | 6/2019 |
| CN | 110045936 A | 7/2019 |
| CN | 110147192 A | 8/2019 |
| CN | 110806829 A | 2/2020 |
| CN | 111124561 A | 5/2020 |
| EP | 3296838 A1 | 3/2018 |
| JP | 2017054471 A | 3/2017 |
| KR | 20170101879 A | 9/2017 |

* cited by examiner

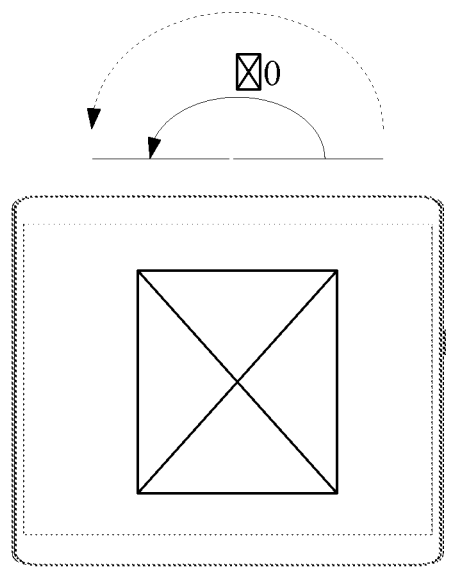
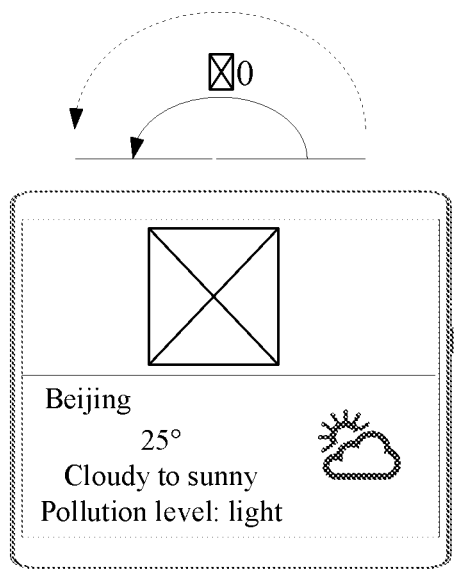
FIG. 5A  FIG. 5B
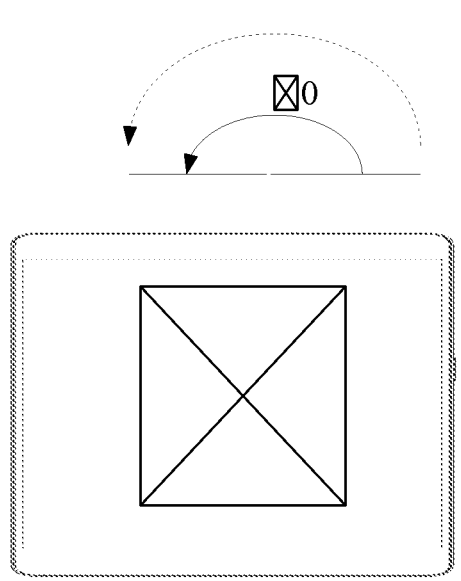
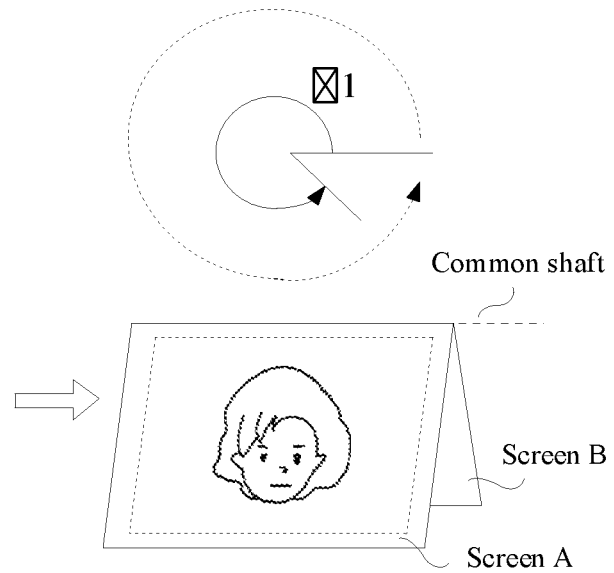
FIG. 6A  FIG. 6B

DISPLAY METHOD FOR DEVICE HAVING FOLDABLE SCREEN AND FOLDABLE SCREEN DEVICE

CROSS-REFERENCE TO RELATED APPLICATIONS

This is a continuation of U.S. patent application Ser. No. 17/687,118 filed on Mar. 4, 2022, now U.S. Pat. No. 11,775,025, which is a continuation of International Patent Application No. 201910838420.X filed on Sep. 5, 2019. All of the aforementioned patent applications are hereby incorporated by reference in their entireties.

TECHNICAL FIELD

Embodiments of this disclosure relate to the field of electronic technologies, and in particular, to a display method for a device having a foldable screen and a foldable screen device.

BACKGROUND

Currently, as flexible screen technologies rapidly develop, flexible foldable touchscreens have been applied to mobile phone products, so that a user can fold or unfold a screen, to meet use requirements of the user for different screen sizes. Generally, a foldable screen of a foldable screen device may present different fold statuses after being folded by a user, and the fold status may be understood as a posture/form formed after the foldable screen is folded. For example, the user performs a folding operation on the foldable screen device, and switches the foldable screen device from an unfolded state to a half-folded state (for example, the half-folded state shown in FIG. 1A), or switches the foldable screen device from the unfolded state to a fully folded state (for example, the fully folded state shown in FIG. 1B). The half-folded state may be understood as a state in which the foldable screen device is not completely folded. How to display an application interface of the foldable screen device in different states is a problem that needs to be considered.

SUMMARY

An objective of embodiments of this disclosure is to provide a display method for a device having a foldable screen and a foldable screen device, to help implement display of an application interface of a foldable screen device in different states, so as to improve user experience.

The foregoing objective and another objective are achieved based on features in the independent claims. Further implementations are provided in the dependent claims, the specification, and the accompanying drawings.

According to a first aspect, an embodiment of this disclosure provides a display method. The method is applied to an electronic device on which a foldable screen is configured. The foldable screen may also be understood as a foldable display screen, for example, a foldable touchscreen, and the foldable screen includes a first screen and a second screen. The method includes: detecting a status of the foldable screen; displaying at least one application interface on the first screen and/or the second screen according to a corresponding first display policy if the status of the foldable screen is a support state or a folded state; or if the status of the foldable screen is an unfolded state, displaying at least one application interface on the foldable screen in the unfolded state according to a corresponding second display policy, where in the unfolded state, the first screen and the second screen form a same plane or form an approximately same plane, and the first display policy is different from the second display policy.

A device having a foldable screen is also referred to as a foldable screen device.

Optionally, the user performs a folding operation or an unfolding operation on the foldable screen by performing a first operation, so as to operate the foldable screen into different states.

It should be noted that, in this embodiment of this disclosure, if it is detected that the foldable screen is in the support state or the folded state, the at least one application interface is displayed on the first screen and/or the second screen according to the first display policy. If it is detected that the foldable screen is in the unfolded state, the at least one application interface is displayed on the foldable screen in the unfolded state. Therefore, the foldable screen can implement display of an application interface in different states such as the support state, the folded state, or the unfolded state. This helps improve user experience.

In a possible design, the application interface includes at least one of the following: a system preinstalled application interface, a third-party application interface, an application icon interface, an interface displayed after an application is opened, and a notification message interface.

In a possible design, the detecting a status of the foldable screen includes: if an included angle between the first screen and the second screen falls within a preset first angle range, determining that the status of the foldable screen is the support state, where the first angle range includes angles greater than a preset first angle threshold and less than 180 degrees, and/or angles greater than 180 degrees and less than or equal to a preset second angle threshold; or if the included angle between the first screen and the second screen falls within a preset second angle range, determining that the status of the foldable screen is the folded state, where the second angle range includes angles greater than or equal to 0 degrees and less than or equal to the first angle threshold, and/or angles greater than the preset second angle threshold and less than or equal to 360 degrees; or if the included angle between the first screen and the second screen is 180 degrees, determining that the status of the foldable screen is the unfolded state.

In this embodiment of this disclosure, the foldable screen device may determine the status of the foldable screen by detecting the included angle between the first screen and the second screen, so that the application interface is displayed in the determined status. This helps improve user experience.

In a possible design, the displaying at least one application interface on the first screen and/or the second screen according to a corresponding first display policy if the status of the foldable screen is a support state or a folded state includes: if the at least one application interface includes a first application interface, displaying one part of the first application interface on the first screen, and displaying the other part of the first application interface on the second screen; or if the at least one application interface includes the first application interface, displaying the first application interface on one of the first screen and the second screen; or if the at least one application interface includes the first application interface and a second application interface, displaying the first application interface on the first screen, and displaying the second application interface on the second screen.

In this embodiment of this disclosure, if the status of the foldable screen is the support state or the folded state, the at least one application interface is displayed on the first screen and/or the second screen. Therefore, when the status of the foldable screen is the support state or the folded state, display of the application interface can be implemented. This helps improve user experience.

In a possible design, if the at least one application interface includes the first application interface, the displaying the first application interface on one of the first screen and the second screen includes: when the first screen and the second screen are rotated away from each other, determining, based on an image captured by a camera, that the first screen is a screen being watched by a user, and displaying the first application interface on the first screen; or determining, based on an image captured by the camera, that the second screen is a screen being watched by the user, and displaying the first application interface on the second screen; or when the first screen and the second screen are rotated away from each other, if it is determined, based on a quantity of first contact points between a finger of the user and the first screen and a quantity of second contact points between a finger of the user and the second screen, that the quantity of first contact points is less than or equal to the quantity of second contact points, displaying the first application interface on the first screen; or if it is determined that the quantity of first contact points is greater than the quantity of second contact points, displaying the first application interface on the second screen; or when the first screen and the second screen are rotated away from each other, if it is determined, based on a first contact area between a finger of the user and the first screen and a second contact area between a finger of the user and the second screen, that the first contact area is less than or equal to the second contact area, displaying the first application interface on the first screen; or if it is determined that the first contact area is greater than the second contact area, displaying the first application interface on the second screen.

In this embodiment of this disclosure, if the status of the foldable screen is the support state or the folded state, the at least one application interface is displayed on the first screen or the second screen. Therefore, when the status of the foldable screen is the support state or the folded state, display of the application interface can be implemented. This helps improve user experience.

In a possible design, if the at least one application interface includes the first application interface, the displaying the first application interface on one of the first screen and the second screen includes: when the first screen and the second screen are rotated toward each other, displaying the first application interface on the second screen if a plane on which the first screen is located is parallel to a reference plane; or when the first screen and the second screen are rotated toward each other, displaying the first application interface on the first screen if a plane on which the second screen is located is parallel to the reference plane; or when the first screen and the second screen are rotated toward each other, determining, based on an image captured by a camera, that the first screen is a screen being watched by a user, and displaying the first application interface on the first screen; or determining, based on an image captured by the camera, that the second screen is a screen being watched by the user, and displaying the first application interface on the second screen.

In this embodiment of this disclosure, if the status of the foldable screen is the support state or the folded state, the at least one application interface is displayed on the first screen or the second screen. Therefore, when the status of the foldable screen is the support state or the folded state, display of the application interface can be implemented. This helps improve user experience.

In a possible design, if the at least one application interface includes the first application interface and the second application interface, displaying the first application interface on one of the first screen and the second screen, and displaying the second application interface on the other screen of the first screen and the second screen include: when the first screen and the second screen are rotated away from each other, if it is determined that the first application interface is an application interface being operated, and it is determined, based on an image captured by a camera, that the first screen is a screen facing an owner user, displaying the first application interface on the first screen, and displaying the second application interface on the second screen; or if it is determined that the second screen is a screen facing the owner user, displaying the first application interface on the second screen, and displaying the second application interface on the first screen; or when the first screen and the second screen are rotated away from each other, if it is determined that the second application interface is an application interface being operated, and it is determined, based on an image captured by the camera, that the first screen is a screen facing the owner user, displaying the second application interface on the first screen, and displaying the first application interface on the second screen; or if it is determined that the second screen is a screen facing the owner user, displaying the second application interface on the second screen, and displaying the first application interface on the first screen; or when the first screen and the second screen are rotated away from each other, if it is determined that the first application interface is an application interface being operated, and if it is determined, based on a quantity of first contact points between a finger of the user and the first screen and a quantity of second contact points between a finger of the user and the second screen, that the quantity of first contact points is less than or equal to the quantity of second contact points, displaying the first application on the first screen, and displaying the second application interface on the second screen; or if it is determined that the quantity of first contact points is greater than the quantity of second contact points, displaying the first application interface on the second screen, and displaying the second application interface on the first screen; or when the first screen and the second screen are rotated away from each other, if it is determined that the second application interface is an application interface being operated, and if it is determined, based on a quantity of first contact points between a finger of the user and the first screen and a quantity of second contact points between a finger of the user and the second screen, that the quantity of first contact points is less than or equal to the quantity of second contact points, displaying the second application on the first screen, and displaying the first application interface on the second screen; or if it is determined that the quantity of first contact points is greater than the quantity of second contact points, displaying the first application interface on the second screen, and displaying the second application interface on the first screen; or when the first screen and the second screen are rotated away from each other, if it is determined that the first application interface is an application interface being operated, and if it is determined, based on a first contact area between a finger of the user and the first screen and a second contact area between a finger of the user and the second screen, that the first contact area is less than or equal to the second contact area, displaying the first application on the first screen, and displaying the second application interface on the second screen; or if it is determined that the first contact area is greater than the second contact area, displaying the first application interface on the second screen, and displaying the second application interface on the first screen; or when the first screen and the second screen are rotated away from each other, if it is determined that the second application interface is an application interface being operated, and if it is determined, based on a first contact area between a finger of the user and the first screen and a second contact area between a finger of the user and the second screen, that the first contact area is less than or equal to the second contact area, displaying the second application on the first screen, and displaying the first application interface on the second screen; or if it is determined that the first contact area is greater than the second contact area, displaying the first application interface on the second screen, and displaying the second application interface on the first screen.

In this embodiment of this disclosure, if the status of the foldable screen is the support state or the folded state, the at least one application interface is displayed on the first screen and the second screen. Therefore, when the status of the foldable screen is the support state or the folded state, display of the application interface can be implemented. This helps improve user experience.

In a possible design, if the at least one application interface includes the first application interface and the second application interface, displaying the first application interface on one of the first screen and the second screen, and displaying the second application interface on the other screen of the first screen and the second screen include: when the first screen and the second screen are rotated toward each other, if it is determined that the first application interface is an application interface being operated and a plane on which the first screen is located is parallel to a reference plane, displaying the first application interface on the second screen, and displaying the second application interface on the first screen; or when the first screen and the second screen are rotated toward each other, if it is determined that the second application interface is an application interface being operated and a plane on which the first screen is located is parallel to the reference plane, displaying the second application interface on the second screen, and displaying the first application interface on the first screen; or when the first screen and the second screen are rotated toward each other, if it is determined that the first application interface is an application interface being operated and a plane on which the second screen is located is parallel to the reference plane, displaying the first application interface on the first screen, and displaying the second application interface on the second screen; or when the first screen and the second screen are rotated toward each other, if it is determined that the first application interface is an application interface being operated and a plane on which the second screen is located is parallel to the reference plane, displaying the second application interface on the first screen, and displaying the first application interface on the second screen.

In this embodiment of this disclosure, if the status of the foldable screen is the support state or the folded state, the at least one application interface is displayed on the first screen and the second screen. Therefore, when the status of the foldable screen is the support state or the folded state, display of the application interface can be implemented. This helps improve user experience.

In a possible design, displaying at least one application interface on the first screen and/or the second screen according to the second display policy corresponding to the folded state if it is detected that the status of the foldable screen is the unfolded state includes: if the at least one application interface includes a first application interface, displaying the first application interface on the foldable screen in the unfolded state; or if the at least one application interface includes the first application interface and a second application interface, displaying the first application interface on the first screen in the unfolded state, and displaying the second application interface on the second screen; or if the at least one application interface includes the first application interface and the second application interface, displaying the first application interface and the second application interface in a stacked manner on the foldable screen in the unfolded state.

In this embodiment of this disclosure, if the status of the foldable screen is the unfolded state, the at least one application interface is displayed on the foldable screen in the unfolded state. Therefore, when the status of the foldable screen is the unfolded state, display of the application interface can be implemented. This helps improve user experience.

In a possible design, displaying an application interface on the first screen or the second screen includes: controlling a display direction of the application interface to be perpendicular to a bottom edge of the first screen, where the bottom edge of the first screen is an edge that is of the first screen and that is parallel to a horizontal plane when the foldable screen is in the folded state; and/or controlling the display direction of the application interface to be perpendicular to a bottom edge of the second screen, where the bottom edge of the second screen is an edge that is of the second screen and that is parallel to the horizontal plane when the foldable screen is in the folded state.

In this embodiment of this disclosure, a method of content of the application interface is adjusted to a visual direction of the user, so that the user can conveniently view the displayed application interface in different states of the foldable screen. This helps improve user experience.

According to a second aspect, an embodiment of this disclosure further provides a foldable screen device. The foldable screen device includes a sensor, a foldable screen that includes a first screen and a second screen, one or more processors, and one or more memories that store one or more computer programs. The one or more computer programs include instructions, and when the instructions are executed by the one or more processors, the foldable screen device is enabled to perform the technical solution according to any one of the first aspect and the possible designs of the first aspect.

According to a third aspect, an embodiment of this disclosure further provides a foldable screen device. The foldable screen device includes modules/units that perform the method according to any one of the first aspect or the possible designs of the first aspect. These modules/units may be implemented by hardware, or may be implemented by hardware executing corresponding software.

According to a fourth aspect, an embodiment of this disclosure further provides a chip. The chip is coupled to a memory in a foldable screen device, and performs the technical solution in any one of the first aspect or the possible designs of the first aspect of the embodiments of this disclosure. In this embodiment of this disclosure, "coupling" means that two components are directly or indirectly connected to each other.

According to a fifth aspect, an embodiment of this disclosure further provides a computer-readable storage medium. The computer-readable storage medium includes a computer program, and when the computer program runs on a foldable screen device, the foldable screen device is enabled to perform the technical solution according to any one of the first aspect or the possible designs of the first aspect of the embodiments of this disclosure.

According to a sixth aspect, an embodiment of this disclosure further provides a computer program product. When the computer program product runs on a foldable screen device, the foldable screen device is enabled to perform the technical solution according to any one of the first aspect or the possible designs of the first aspect of the embodiments of this disclosure.

According to a seventh aspect, an embodiment of this disclosure further provides a graphical user interface on a foldable screen device. The foldable screen device includes a foldable display screen, one or more memories, and one or more processors. The one or more processors are configured to execute one or more computer programs stored in the one or more memories. The graphical user interface includes a graphical user interface displayed when the foldable screen device performs the technical solution according to any one of the first aspect or the possible designs of the first aspect of the embodiments of this disclosure.

BRIEF DESCRIPTION OF DRAWINGS

FIG. 5A and FIG. 5B are schematic diagrams of unfolding scenarios according to an embodiment of this disclosure.

FIGS. 6A, 6B, 6C, and 6D are schematic diagrams of an angle change trend in a folding scenario according to an embodiment of this disclosure.

DESCRIPTION OF EMBODIMENTS

To make objectives, technical solutions, and advantages of embodiments of this disclosure clearer, the following further describes the embodiments of this disclosure in detail with reference to the accompanying drawings.

Some terms of the embodiments of this disclosure are first described, so as to help persons skilled in the art have a better understanding.

A device having a foldable screen (also briefly referred to as "foldable electronic device", "foldable screen device", or "electronic device" below) is an electronic device with a foldable display screen. The foldable display screen in the electronic device may be an integrated flexible display screen, or may be a spliced display screen including a plurality of flexible display screens and a hinge located between every two flexible display screens, or may be a spliced display screen including a plurality of rigid screens and one flexible screen located between every two rigid screens, or may be a spliced display screen including a plurality of rigid screens and a hinge located between every two rigid screens. This is not limited in the embodiments of this disclosure.

A fold status is a posture/form presented after the display screen of the electronic device is folded. The electronic device may control, in different fold statuses, the display screen to display content by using corresponding display policies. The fold statuses may include a folded state and a support state. The user may fold the display screen, and adjust an included angle between folded screens, to form a fold status of the display screen. Therefore, the fold status of the display screen may be represented by using an included angle between the folded screens. Optionally, the fold status of the display screen may be represented by using an included angle between the folded screens and spatial information, and the spatial information is used to indicate that the folded screens are rotated away from each other and/or folded toward each other.

It should be noted that in the embodiments of this disclosure, "at least one" means one or more, and "a plurality of" means two or more. In descriptions of the embodiments of this disclosure, terms such as "first" and "second" are merely used for distinguishing descriptions, and cannot be understood as indicating or implying relative importance, or as indicating or implying a sequence.

Figure 1A:
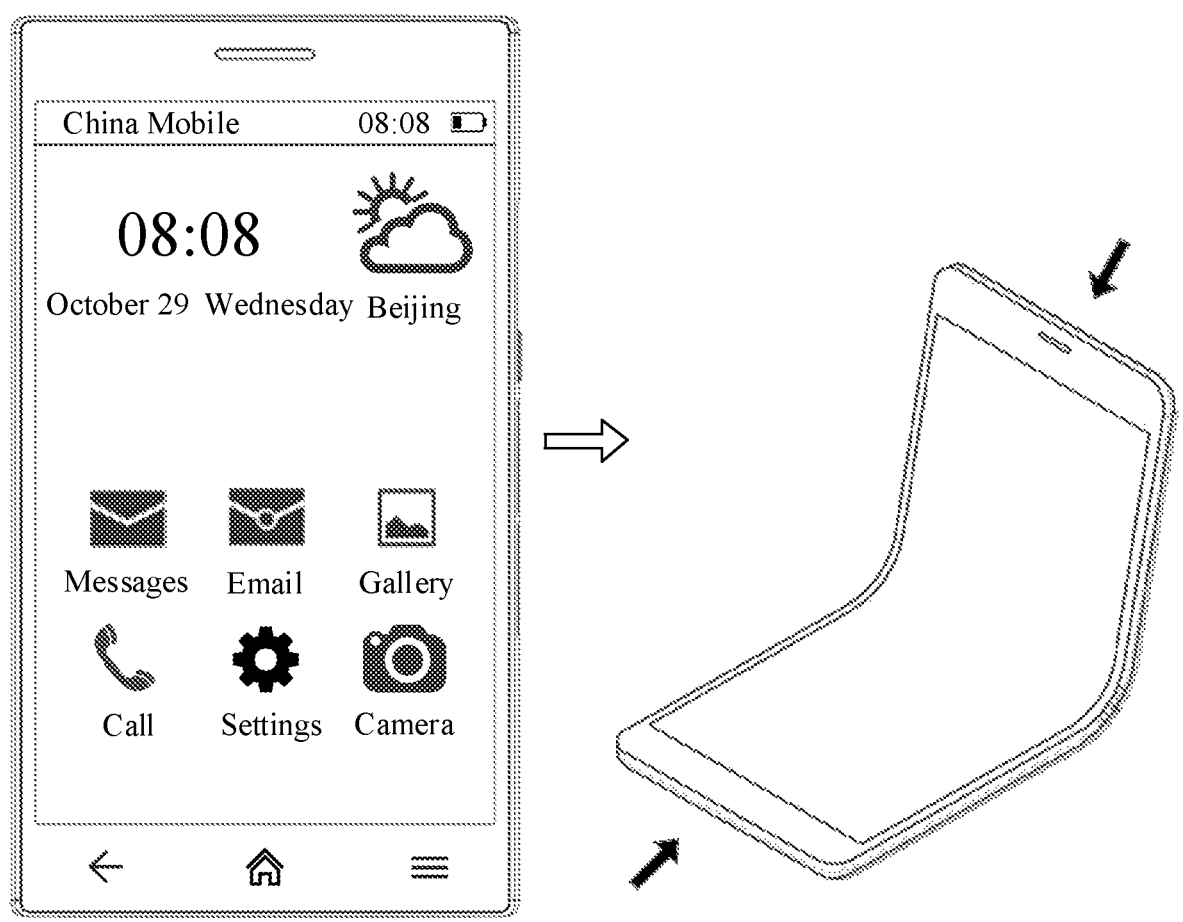
FIG. 1A is a schematic diagram of a foldable screen device according to an embodiment of this disclosure.
Figure 1B:
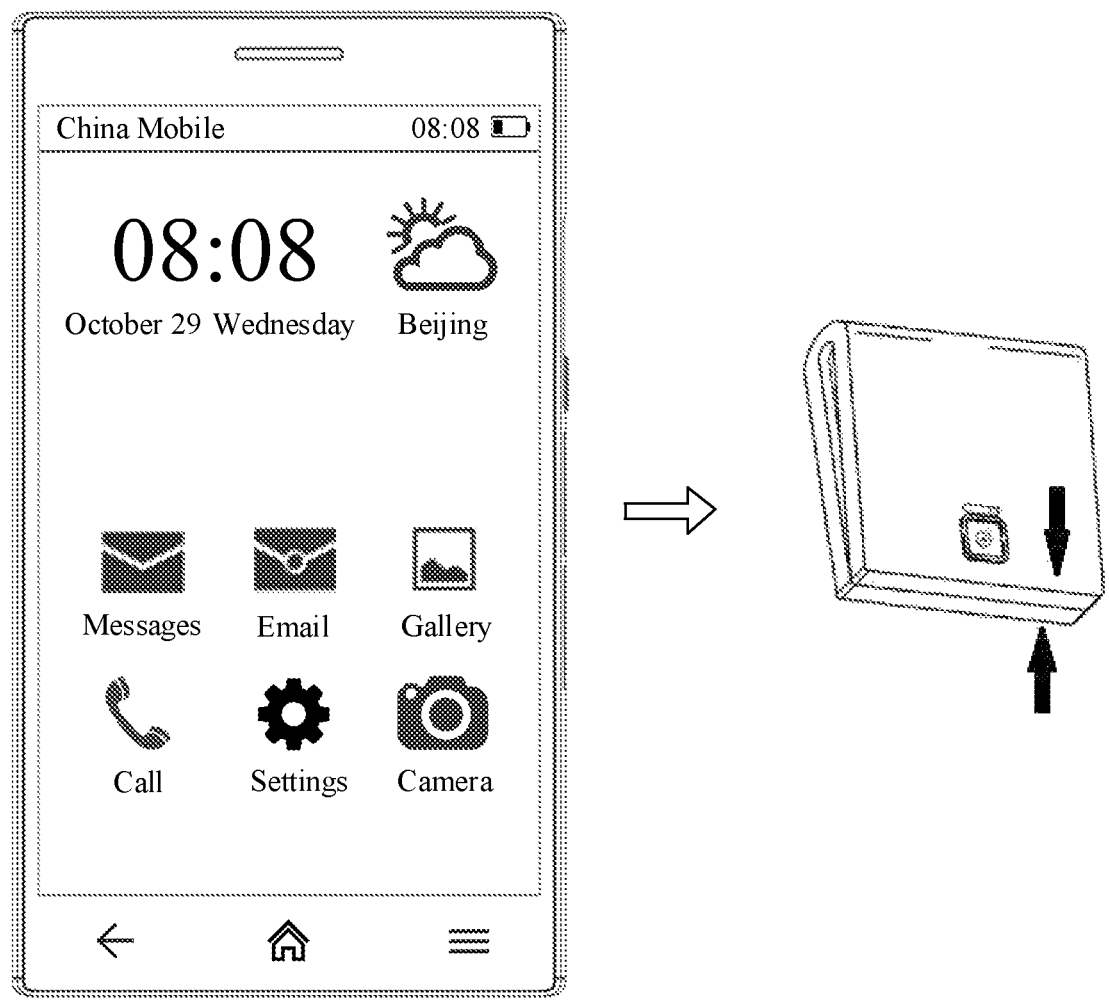
FIG. 1B is a schematic diagram of a foldable screen device according to an embodiment of this disclosure.

To better understand the technical solutions provided in the embodiments of this disclosure, the following first describes an application scenario of the embodiments of this disclosure. With continuous development of a display screen technology, the emergence of a flexible screen technology brings a new breakthrough to an electronic device. In an example in which a foldable electronic device is a foldable mobile phone, a display screen of the foldable mobile phone still has a size of other electronic devices when the foldable display screen is fully folded, and the foldable mobile phone is convenient to carry. When the display screen is fully unfolded, it becomes a tablet computer that can be used for both entertainment and office functions, catering to users who are looking for portability and versatility. The user can view and use, by using the display screen of the foldable electronic device, service information provided by the foldable electronic device. The embodiments of this disclosure may be applied to any electronic device having a foldable touch display screen, for example, applied to a foldable mobile phone shown in FIG. 1A and FIG. 1B.

The foldable electronic device may provide service information by using an application interface. It should be understood that the application interface is an application-related interface, for example, includes a system preinstalled application interface, a third-party application interface, an application icon interface, an interface displayed after an application is opened, and a notification message interface. The foldable electronic device may implement different functions by installing different applications. The applications may include one or more of the following: a camera application, an instant messaging application, and the like. There may be a plurality of instant messaging applications, such as WeChat, Tencent chat software (QQ), WhatsApp Messenger, Line, Kakao Talk, and DingTalk. A user may send information such as text, voice, an image, a video file, and another file to another contact through the instant messaging application. Alternatively, a user may implement a voice call, a video call, or the like with another contact through the instant messaging application. The application designed in the following may be an application installed on the electronic device before delivery, or may be an application downloaded and installed by the electronic device from a network side, or may be an application received by the electronic device from another electronic device. This is not limited in the embodiments of this disclosure.

Currently, there is no reasonable solution about how does a foldable electronic device display corresponding content in different states (including a folded state, a support state, and an unfolded state) of a foldable screen.

The folded state may be understood as a fully folded state, the support state may be understood as a semi-folded state or an incompletely folded state, and the unfolded state may be understood as a fully unfolded state.

To resolve the foregoing problem, the embodiments of this disclosure provide a display method for a device having a foldable screen. An electronic device detects a status of the foldable screen, and displays an application interface according to a display policy corresponding to a state of the foldable screen. In this way, display of the application interface can be implemented in different states. Even when a user performs a folding operation on the foldable electronic device, after the display screen is folded, the user can view the application interface, and further view and use service information provided in different states of the foldable screen, so that user experience is further improved.

It should be understood that the embodiments of this disclosure may be applied to any electronic device having a foldable screen. The electronic device in the embodiments of this disclosure may be a portable electronic device, such as a mobile phone or a tablet computer. An example embodiment of a portable electronic device includes but is not limited to a portable electronic device using IOS®, ANDROID®, MICROSOFT®, or another operating system. The portable device may alternatively be another portable device provided that the other portable device has a foldable touchscreen and an algorithm operation capability (capable of running the touchscreen display procedure provided in the embodiments of this disclosure). It should further be understood that, in some other embodiments of this disclosure, the electronic device may not be a portable device, but a desktop computer having a foldable touchscreen and an algorithm operation capability (capable of running the touchscreen display procedure provided in the embodiments of this disclosure).

Figure 2:
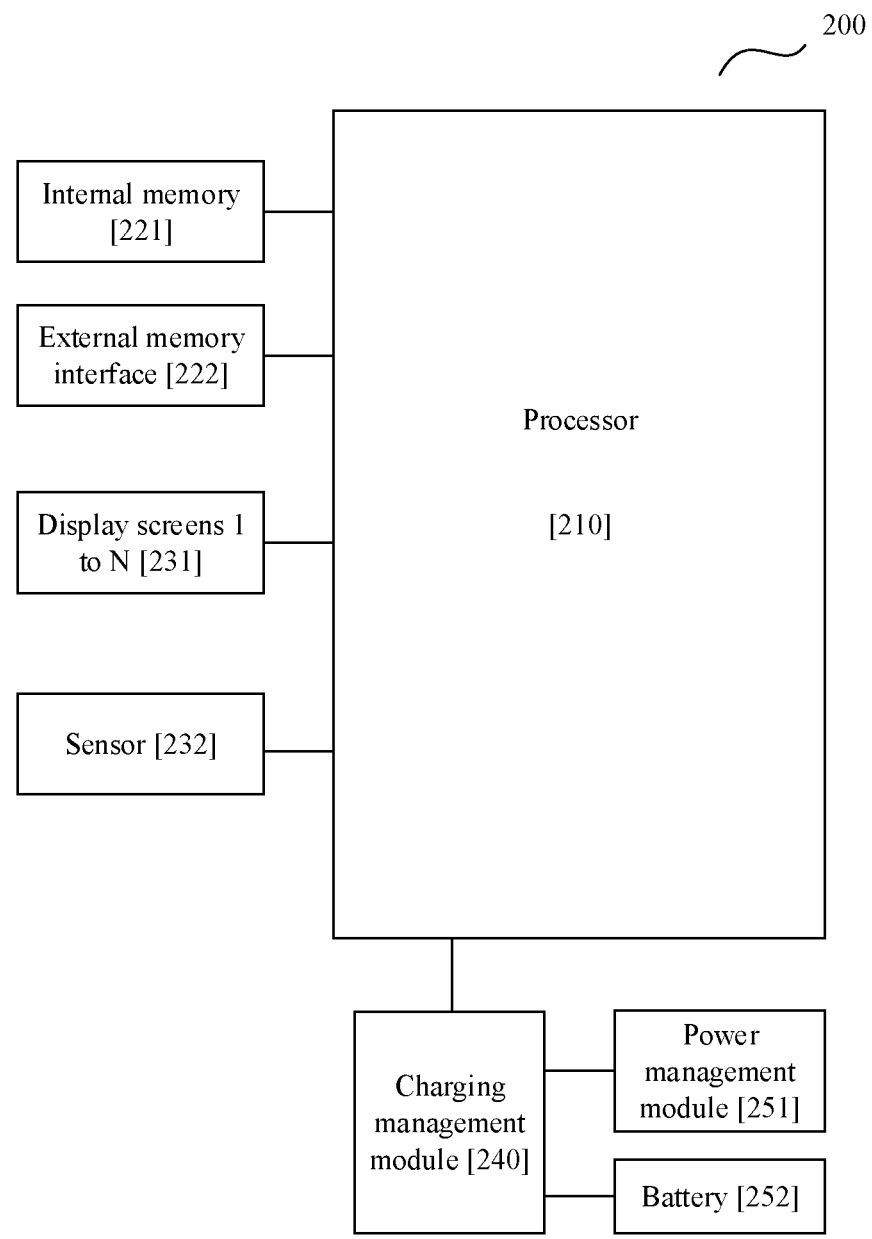
FIG. 2 is a schematic diagram of a hardware structure of an electronic device according to an embodiment of this disclosure.

For example, FIG. 2 is a schematic diagram of a structure of an electronic device to which the embodiments of this disclosure may be applied. The electronic device 200 may include a processor 210, an internal memory 221, an external memory interface 222, at least one display screen 231 (which is a foldable display screen, that is, a foldable screen), a sensor 232, a charging management module 240, a power management module 251, and a battery 252.

In some other embodiments, the electronic device 200 further includes an antenna 1, an antenna 2, a mobile communications module, and a wireless communications module; may further include a button, such as a power button and a volume adjustment button; may further include a camera, such as a front-facing camera and a rear-facing camera; may further include a motor, used to generate a vibration prompt (for example, an incoming call vibration prompt); and may further include an indicator, for example, an indicator light, used to indicate a charging status or a battery level change, or used to indicate a short message service (SMS) message, a missed call, a notification, or the like (these are not shown in FIG. 2). In addition, the electronic device 200 may further include audio modules (a speaker, a receiver, a microphone, and a headphone jack), a Universal Serial Bus (USB) interface, and the like.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. The electronic device 200 may implement a display function by using the GPU, the display screen 231, the AP, and the like. The GPU is a microprocessor for image processing, and is connected to the display screen 231 and the AP. The GPU is configured to: perform mathematical and geometric calculation, and render an image. The processor 210 may include one or more GPUs that execute program instructions to generate or change display information.

In the embodiments of this disclosure, the processor 210 may run the display procedure for the device having a foldable screen provided in the embodiments of this disclosure, to recognize different states of the display screen 231, and display an application interface based on the different states of the display screen 231. The processor 210 may integrate different components. For example, when a CPU and a GPU are integrated, the CPU and the GPU may cooperate to execute instructions of the display method for the device having a foldable screen provided in the embodiments of this disclosure. For example, a part of algorithms in the display method for the device having a foldable screen are executed by the CPU, and another part of the algorithms are executed by the GPU for faster processing efficiency.

In some embodiments, a memory may be further disposed in the processor 210, and is configured to store instructions and data. For example, the memory in the processor 210 may be a cache. The memory may store instructions or data that have/has just been used or are/is cyclically used by the processor 210. If the processor 210 needs to use the instruction or the data again, the processor 210 may directly invoke the instruction or the data from the memory. Therefore, repeated access is avoided, a waiting time of the processor 210 is reduced, and system efficiency is improved.

The internal memory 221 may be configured to store computer-executable program code, where the computer-executable program code includes instructions. The processor 210 executes various function applications and data processing of the electronic device 200 by running the instructions stored in the internal memory 221. The internal memory 221 may include a program storage area and a data storage area. The program storage area may store an operating system, an application required by at least one function (for example, a sound play function and an image/text display function), and the like. The data storage area may store data (for example, audio data or a phone book) created in a process of using the electronic device 200. In addition, the internal memory 221 may include a high-speed random-access memory (RAM), or may include a nonvolatile memory such as at least one magnetic disk storage device, a flash memory, or a Universal Flash Storage (UFS).

In the embodiments of this disclosure, the internal memory 221 may store an instruction used to recognize a status of the display screen 231 and an instruction used to display an application interface based on the status of the display screen 231. The processor 210 may invoke these instructions stored in the internal memory 221, to execute a display process of the device having a foldable screen.

The external memory interface 222 may be configured to connect to an external memory card (for example, a micro Secure Digital (SD) card), to extend a storage capability of the electronic device 200. The external memory card communicates with the processor 210 through the external memory interface 222, to implement a data storage function. For example, a file such as an image or a video is stored in the external storage card.

The display screen 231 may be configured to display an image, a video, and the like. The display screen 231 may include a display panel. The display panel may be a liquid-crystal display (LCD), an organic light-emitting diode (OLED), an active-matrix organic light emitting diode (AMOLED), a flexible light-emitting diode (FLED), a mini light-emitting diode (LED), a micro-LED, a micro-OLED, a quantum dot light emitting diode (QLED), or the like. In some embodiments, the electronic device 200 may include one or N display screens 231, where N is a positive integer greater than 1.

Figure 3A:
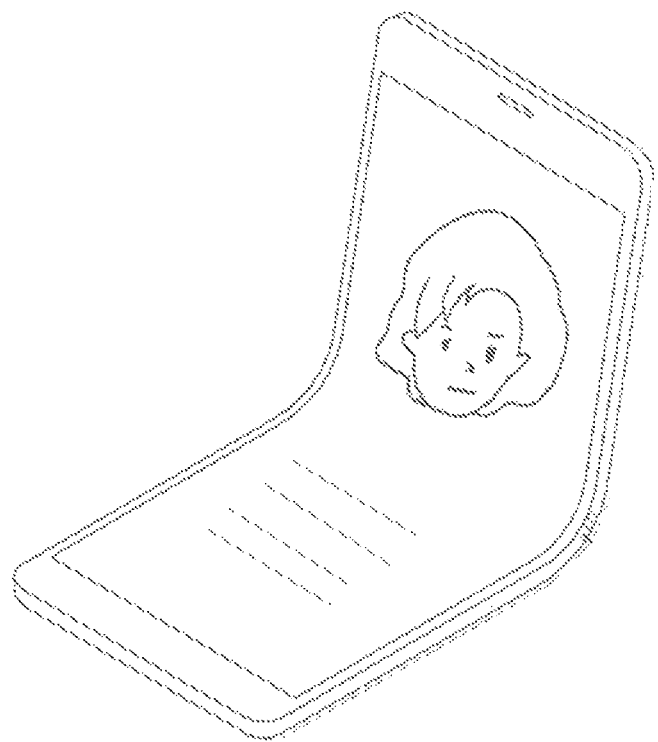
FIG. 3A and FIG. 3B are schematic diagrams of a foldable screen device in a half-folded state according to an embodiment of this disclosure.
Figure 3B:
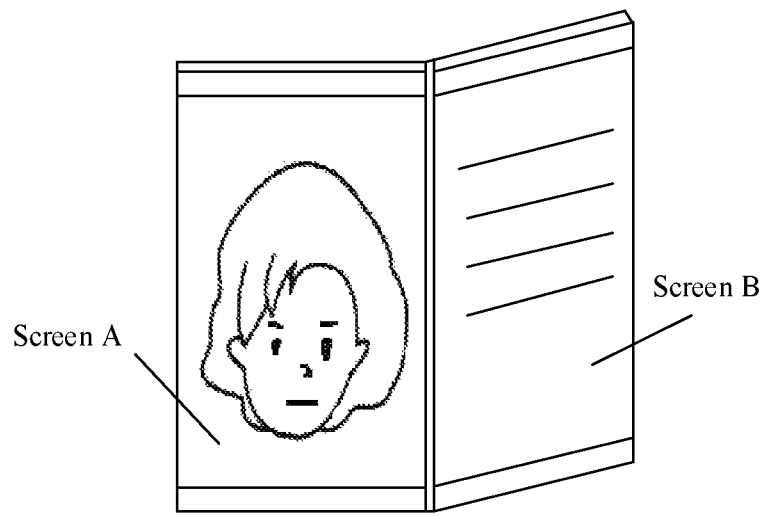

In the embodiments of this disclosure, the display screen 231 may be an integrated flexible display screen (shown in FIG. 3A), or may be a spliced display screen (shown in FIG. 3B) including a plurality of rigid screens and one flexible screen located between every two rigid screens. In a folding process of the display screen 231, an application interface is displayed on a complete screen before the folding, and screens formed after the folding may display application interfaces respectively. Therefore, it may be understood that the display screen 231 forms visual "independent screens" after the folding. For example, the screen A and the screen B shown in FIG. 3B may be understood as two "independent screens" formed after the display screen is folded.

In the embodiments of this disclosure, the display screen 231 is also referred to as a foldable touchscreen, a foldable screen, a foldable display screen, or the like.

The sensor 232 may include an acceleration sensor, or may include one or more of an acceleration sensor, a pressure sensor, a gyro sensor, a barometric sensor, a magnetic sensor, an infrared sensor, a distance sensor, a proximity sensor, a fingerprint sensor, a temperature sensor, a touch sensor, an ambient optical sensor, a bone conduction sensor, and the like. In some embodiments, a touch sensor may be built in each of the one or N display screens 231. The touch sensor detects a touch operation performed by the user on the display screen 231, and reports touch location information of the user on the display screen 231 to the processor 210. The processor 210 determines, based on the touch location information reported by the touch sensor, that an instruction or operation is received.

In a process of folding the display screen 231, the sensor 232 in the electronic device 200 may collect a movement trend or angle of the display screen 231 in real time. For example, the acceleration sensor collects current spatial representation information of the display screen 231. The spatial representation information may be acceleration information (also referred to as "acceleration data") on three axes. The processor 210 may determine, based on the current spatial representation information of the display screen 231, space information and included angle information (including a degree of an included angle) between every two screens after the display screen 231 is folded. A shaft between every two screens when the display screen 231 is being folded may be expressed as a common shaft of the two screens. It may be understood as that the display screen 231 is folded along the common shaft in a folding process. The spatial information may be used to represent a fold posture of the display screen 231. The fold posture includes folding in a direction in which two screens are rotated toward each other (or referred to as an inward fold posture), folding in a direction in which two screens are away from each other (or referred to as an outward fold posture), a horizontal fold posture, a vertical fold posture, and the like. The degree of the included angle may be a degree of an included angle between the folded screens, or a degree of an included angle between folded housings.

A memory of the electronic device 200 may store a program instruction for recognizing a status of the display screen based on the included angle between the screens. The memory may be the internal memory 221, an external memory card connected through the external memory interface 222, or the like.

The processor 210 may determine a current target fold status of the display screen 231 of the electronic device 200 according to the determined included angle between every two screens of the display screen 231 and the program instruction that is stored in the memory and that is used to recognize a status of the display screen.

The memory of the electronic device 200 may further store a program instruction for displaying an application interface based on the status of the display screen. The processor 210 may determine, according to the determined current status of the display screen 231 and the program instruction that is stored in the memory and that is used to display an application interface based on the status of the display screen, a display policy corresponding to the current status of the electronic device 200, and then display the application interface on the folded display screen 231 according to the corresponding display policy.

The charging management module 240 is configured to receive a charging input from a charger. The charger may be a wireless charger or a wired charger. In some embodiments in which the charger is a wired charger, the charging management module 240 may receive a charging input from the wired charger through the USB port. In some embodiments of wireless charging, the charging management module 240 may receive a wireless charging input by using a wireless charging coil of the electronic device 200. When charging the battery 252, the charging management module

240 may further supply power to the electronic device 200 by using the power management module 251.

The power management module 251 is configured to connect the battery 252, the charging management module 240, and the processor 210. The power management module 251 receives input from the battery 252 and/or the charging management module 240, and supplies power to the processor 210, the internal memory 221, the external memory 222, the display screen 231, and the like. The power management module 251 may be further configured to monitor parameters such as a battery capacity, a quantity of battery cycles, and a battery health status (leakage or impedance). In some other embodiments, the power management module 251 may alternatively be disposed in the processor 210. In other embodiments, the power management module 251 and the charging management module 240 may alternatively be disposed in a same component.

It should be understood that the hardware structure of the electronic device 200 shown in FIG. 2 is merely an example. The electronic device 200 in the embodiments of this disclosure may have more or fewer components than those shown in the figure, two or more components may be combined, or there may be a different component layout. Various components shown in the figure may be implemented in hardware that includes one or more signal processing and/or application-specific integrated circuits, software, or a combination of hardware and software.

With reference to the hardware structure of the electronic device 200 shown in FIG. 2, the following describes in detail the display method for a device having a foldable screen provided in the embodiments of this disclosure.

Figure 4A:
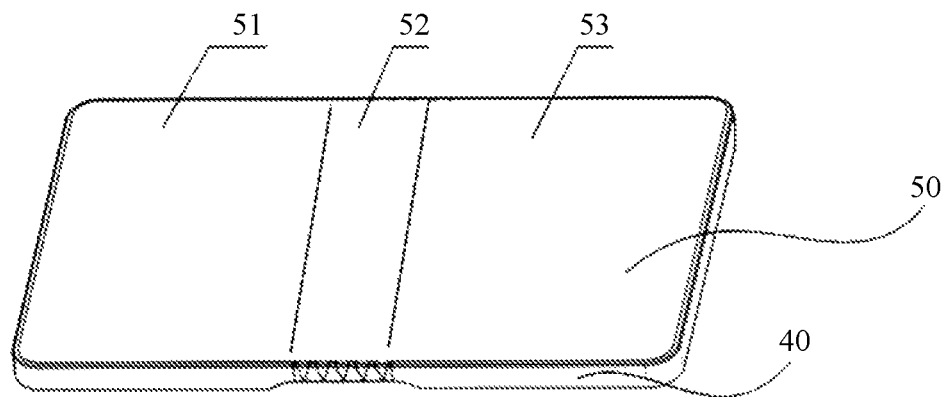
FIG. 4A is a schematic diagram of a foldable screen device in an unfolded state according to an embodiment of this disclosure.
Figure 4B:
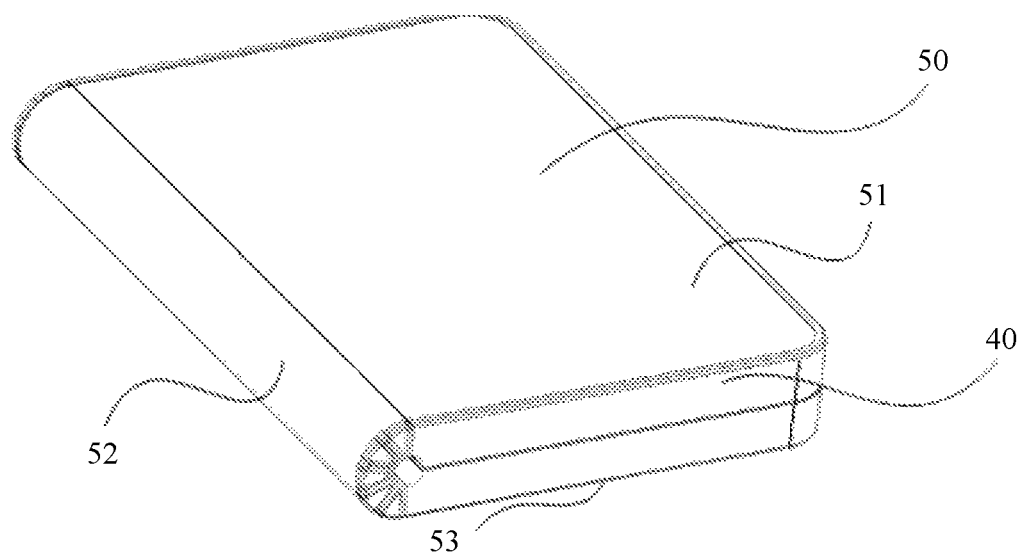
FIG. 4B is a schematic diagram of a foldable screen device in a folded state according to an embodiment of this disclosure.

FIG. 4A and FIG. 4B are schematic diagrams of unfolded and folded states of a screen of an electronic device according to an embodiment of this disclosure. A foldable screen 50 (that is, the display screen 231) provided in this embodiment of this disclosure is applied to a foldable electronic device. FIG. 4A shows a case in which the electronic device is unfolded; FIG. 4B shows a shape of the electronic device after the electronic device is folded. First, as shown in FIG. 4A, when the electronic device is unfolded, a housing 40 of the electronic device is unfolded. At the same time, the foldable screen 50 is unfolded. As shown in FIG. 4B, when the electronic device is folded, the housing 40 of the electronic device is also folded. At the same time, the foldable screen 50 is folded. This is a case in which the screen of the electronic device is folded outward (also referred to as an outward fold posture, or folding in a direction in which two screens are away from each other), that is, a case in which the foldable screen 50 is exposed outside after the electronic device is folded. It should be understood that the screen of the electronic device may alternatively be folded inward (also referred to as an inward fold posture, or folding in a direction in which two screens are rotated toward each other), that is, a case in which after the electronic device is folded, the foldable screen 50 is folded and hidden inside, and the housing 40 is exposed outside.

The foldable screen provided in this embodiment of this disclosure may be one integrated flexible display screen, or may be a display screen including two rigid screens and one flexible screen located between the two rigid screens. With reference to FIG. 4A, it is assumed that the foldable screen provided in this embodiment of this disclosure includes three parts: a first screen 51, a second screen 53, and a bendable area 52 (optional). The bendable area 52 connects the first screen 51 and the second screen 53. When the foldable screen of the electronic device is in an unfolded state, the first screen 51, the second screen 53, and the bendable area 52 (optionally) form a same plane or form an approximate plane, and the sensor 232 may detect that an included angle between the first screen 51 and the second screen 53 is 180 degrees (an actual angle may not reach 180 degrees; the actual angle is used), as shown in FIG. 4A. When the foldable screen of the electronic device is in a folded state, the sensor 232 may detect that an included angle between the first screen 51 and the second screen 53 is, for example, 0 degrees or 360 degrees (an actual angle may not reach 0 degrees or 360 degrees; the actual angle is used), as shown in FIG. 4B. When the foldable screen of the electronic device is not completely folded, the sensor 232 may detect that an included angle between the first screen 51 and the second screen 53 generally falls within, for example, a range from 0 degrees to 180 degrees, or a range from 180 degrees to 360 degrees. The processor 210 may determine the status of the foldable screen based on the included angle between the first screen 51 and the second screen 53 that is detected by the external sensor 232.

It may be understood that, for ease of description, the first screen 51 and the second screen 53 are respectively referred to as screen A and screen B below, to represent two screens formed after the display screen 231 is folded.

In this embodiment of this disclosure, an example in which the display screen 231 of the electronic device 200 is folded once and folded into two screens ("independent screens") is used to describe the display method for a device having a foldable screen. For ease of description, the two screens formed after the display screen 231 is folded are respectively defined as screen A and screen B. Certainly, the display method for a device having a foldable screen provided in the embodiments of this disclosure may also be applied to an implementation process in which the display screen 231 is folded for a plurality of times and forms more than two screens, which is similar to the implementation process in which the display screen 231 is folded once and forms two screens. Details are not described herein. In some embodiments, when the display screen 231 is folded for a plurality of times and forms more than two screens, common shafts between every two screens are parallel.

The following describes in detail the display method for a device having a foldable screen provided in the embodiments of this disclosure with reference to the accompanying drawings and application scenarios. It should be noted that a screen folding process and a screen unfolding process are actually mutually inverse processes, and are similar in processing methods except that angle change trends are opposite. In the embodiments of this disclosure, a process of folding the electronic device in the unfolded state is used as an example for description.

When the electronic device is in the unfolded state, as shown in FIG. 5A, the display screen 231 displays content of only one application interface (also referred to as a scenario of a single-application display state). The display screen 231 of the electronic device displays a Gallery application interface, and content displayed in the Gallery application interface is a face image. An included angle between the screens in the unfolded state, that is, an included angle θ between screen A and screen B is θ0 (for example, θ0 is 180 degrees).

When the electronic device is in the unfolded state, as shown in FIG. 5B, the display screen 231 displays content of two application interfaces (also referred to as a scenario of a split-screen display state). The display screen 231 of the electronic device displays a face image of the Gallery application and weather content of a Weather application.

An included angle θ between screen A and screen B in the unfolded state is θ0 (for example, θ0 is 180 degrees).

Example 1

When the display screen 231 is in the single-application display state, the user folds the electronic device from the unfolded state to the support state (that is, screen A and screen B are rotated away from each other). When the included angle θ between screen A and screen B in the support state meets a first angle range, screen A displays content of one application interface. A specific value of the first angle range may be obtained according to experience. For example, the first angle range is [190 degrees, 360 degrees].

For example, when the user horizontally folds the electronic device outward from the unfolded state shown in FIG. 6A to the support state shown in FIG. 6B, a face image of the Gallery application is displayed on screen A. In the support state shown in FIG. 6B, an included angle θ between screen A and screen B is θ1 (for example, θ1 is 300 degrees).

Figures 6C, 6D:
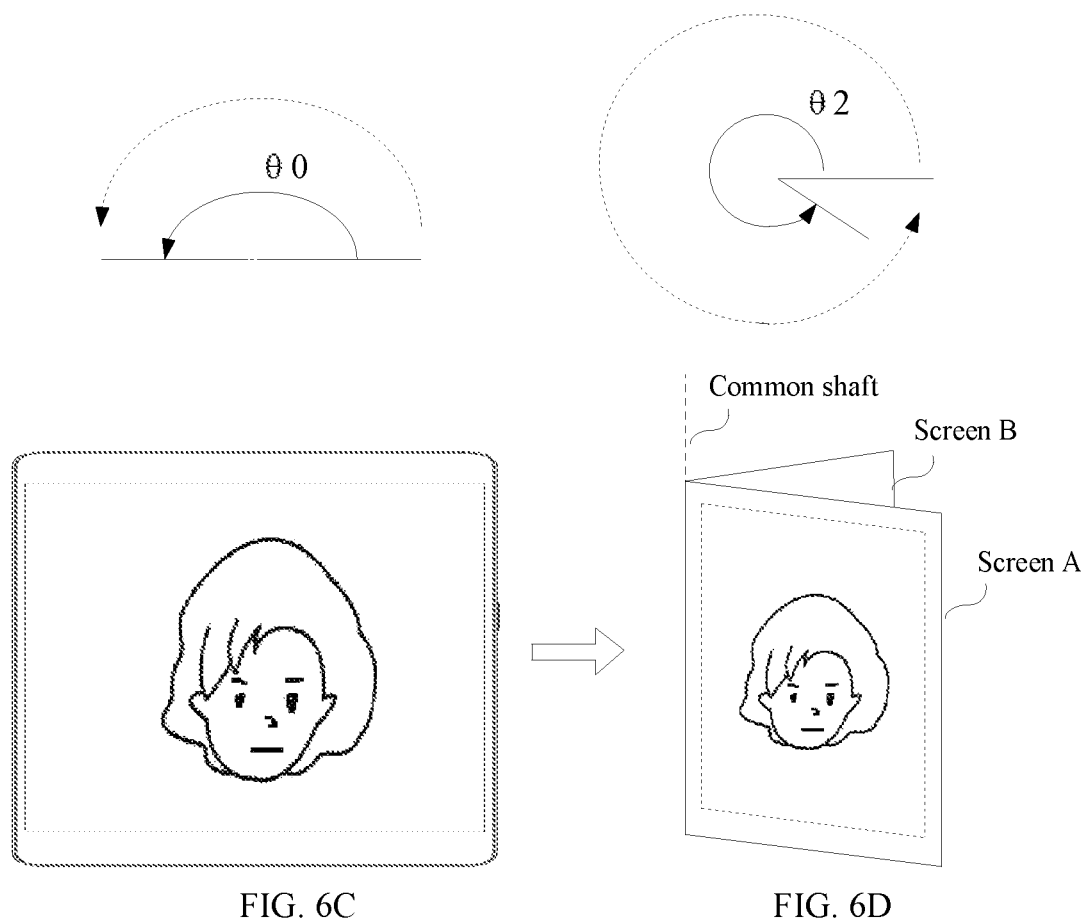

For example, when the user vertically folds the electronic device outward from the unfolded state shown in FIG. 6C to the support state shown in FIG. 6D, a face image of the Gallery application is displayed on screen A. In the support state shown in FIG. 6D, an included angle θ between screen A and screen B is θ2 (for example, θ2 is 330 degrees).

It may be understood that, when the user unfolds the electronic device from the support state to the unfolded state, content of the application interface displayed on screen A is displayed on the display screen 231 in the unfolded state. For example, display of the content changes from FIG. 6B to FIG. 6A, or changes from FIG. 6D to FIG. 6C.

Example 2

When the display screen 231 is in the single-application display state, the user folds the electronic device from the unfolded state to the support state (that is, screen A and screen B are rotated away from each other). When the included angle θ between screen A and screen B in the support state meets the first angle range, screen B displays content of one application interface.

Figures 7A, 7B:
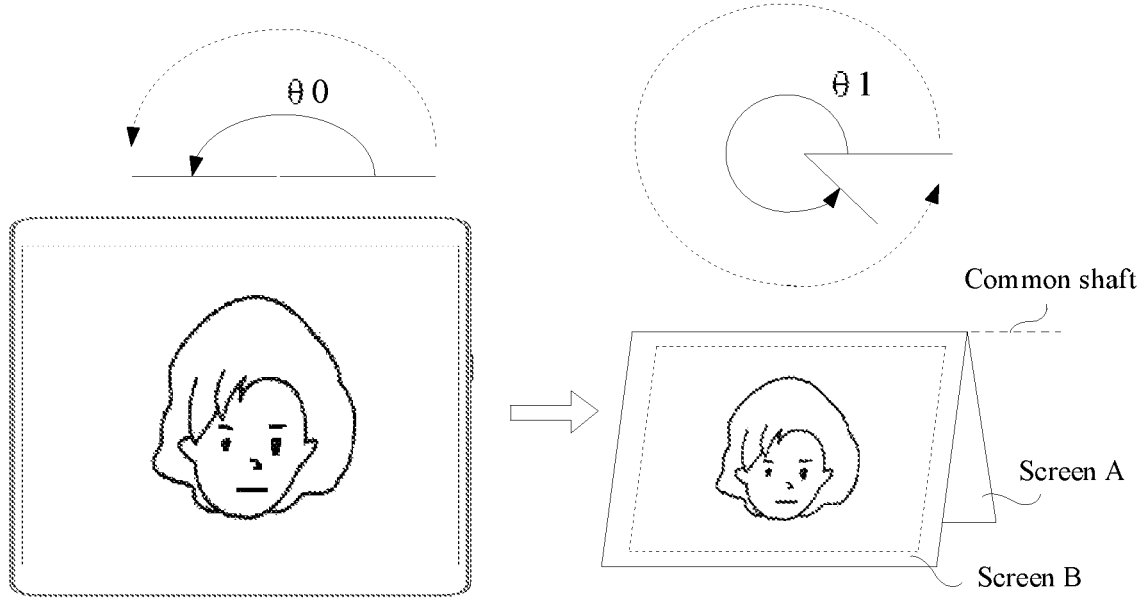
FIGS. 7A, 7B, 7C, and 7D are schematic diagrams of an angle change trend in another folding scenario according to an embodiment of this disclosure.

For example, when the user horizontally folds the electronic device outward from the unfolded state shown in FIG. 7A to the support state shown in FIG. 7B, a face image of the Gallery application is displayed on screen B. In the support state shown in FIG. 7B, an included angle θ between screen A and screen B is θ1.

Figures 7C, 7D:
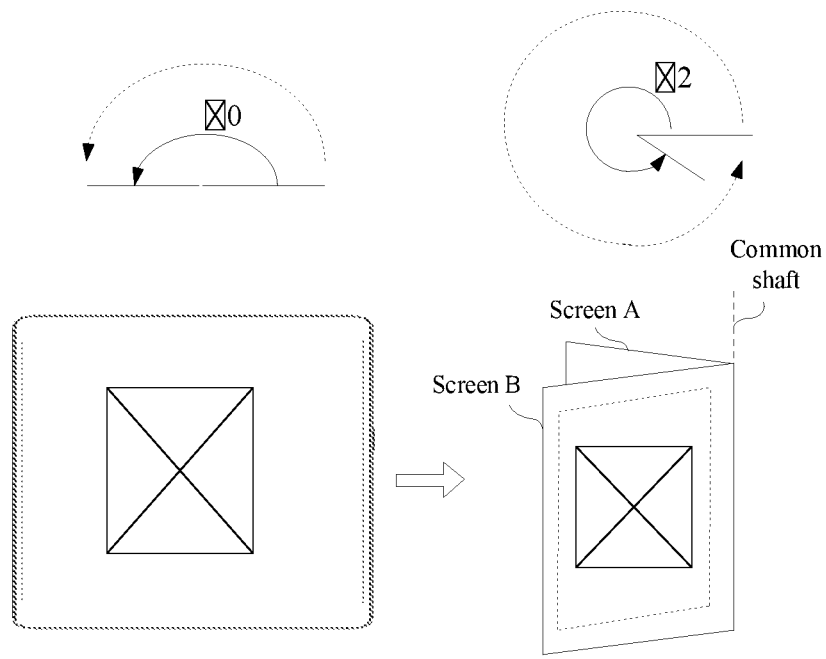

For example, when the user vertically folds the electronic device outward from the unfolded state shown in FIG. 7C to the support state shown in FIG. 7D, a face image of the Gallery application is displayed on screen B. In the support state shown in FIG. 7D, an included angle θ between screen A and screen B is θ2.

It may be understood that, when the user unfolds the electronic device from the support state to the unfolded state, content of the application interface displayed on screen B is displayed on the display screen 231 in the unfolded state. For example, display of the content changes from FIG. 7B to FIG. 7A, or changes from FIG. 7D to FIG. 7C.

Example 3

When the display screen 231 is in the single-application display state, the user folds the electronic device outward from the unfolded state to the support state (that is, screen A and screen B are rotated away from each other). When an included angle θ between screen A and screen B in the support state meets the first angle range, content of one application interface is displayed on each of screen A and screen B, so as to implement an effect of simultaneously viewing by two persons. In particular, when two persons simultaneously watch a movie by using screen A and screen B, user experience is better.

Figure 8A:
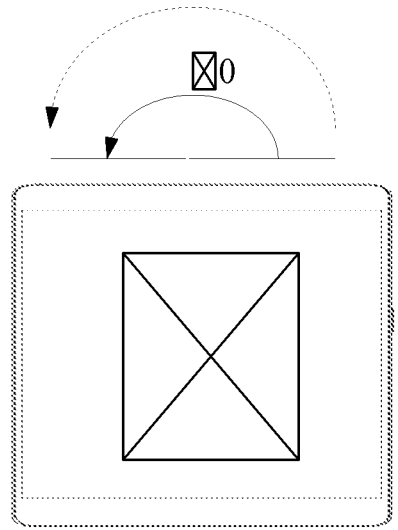
FIGS. 8A, 8B, 8C, 8D, 8E, and 8F are schematic diagrams of an angle change trend in another folding scenario according to an embodiment of this disclosure.
Figure 8B:
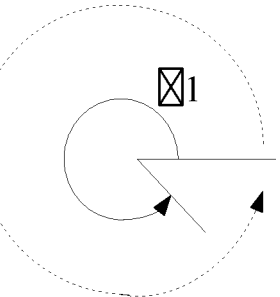
Figure 8B:
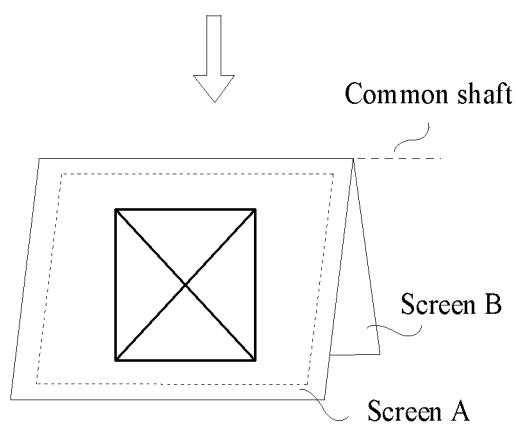
Figure 8C:
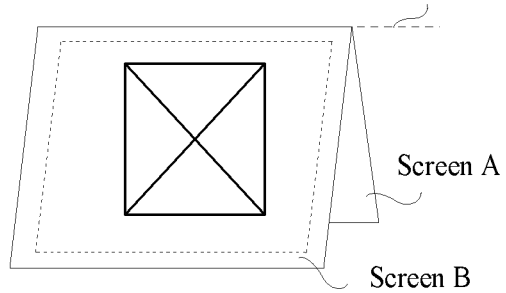

For example, when the user horizontally folds the electronic device outward from the unfolded state shown in FIG. 8A to the support state shown in FIG. 8B, a face image of the Gallery application is displayed on both screen A and screen B, as shown in FIG. 8B and FIG. 8C. In the support state shown in FIG. 8B, an included angle θ between screen A and screen B is θ1.

Figure 8D:
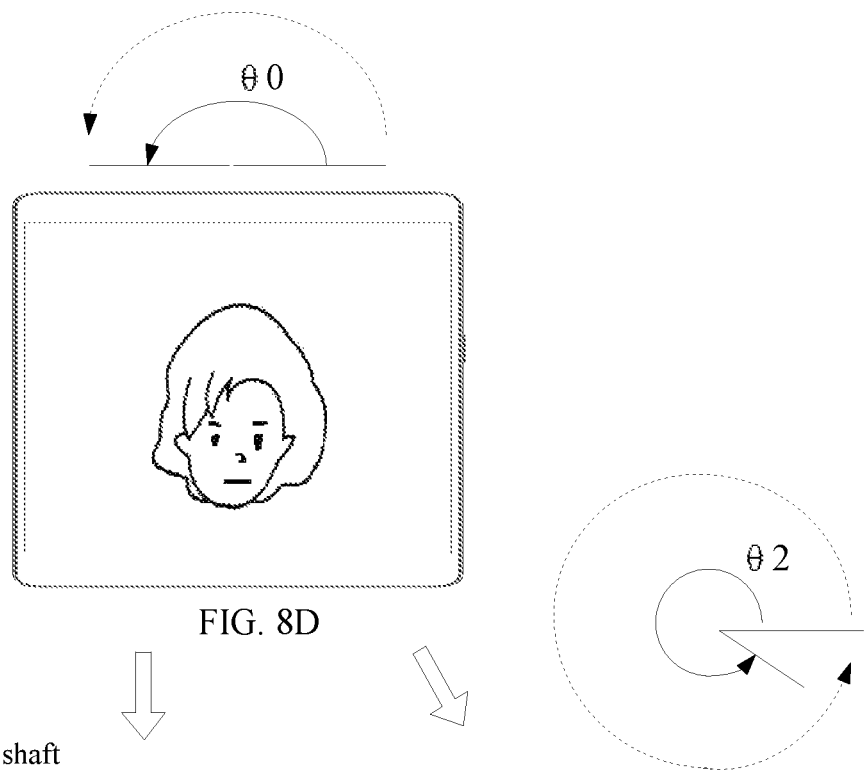
Figure 8E:
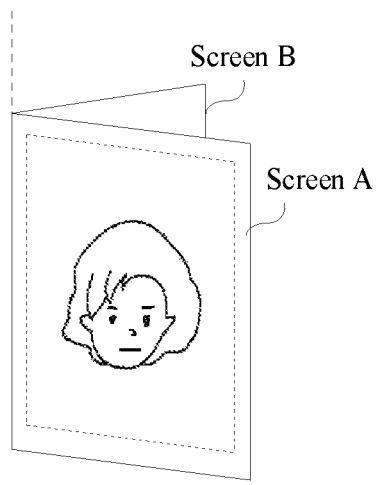
Figure 8F:
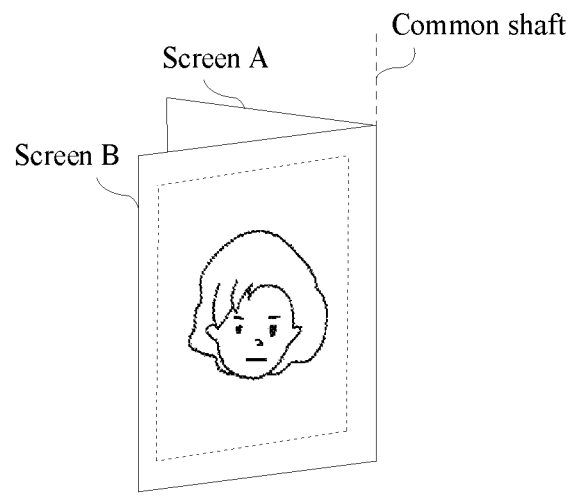

For example, when the user vertically folds the electronic device outward from the unfolded state shown in FIG. 8D to the support state shown in FIG. 8E, a face image of the Gallery application is displayed on both screen A and screen B, as shown in FIG. 8E and FIG. 8F. In the support state shown in FIG. 8E, an included angle θ between screen A and screen B is θ2.

It may be understood that, when the user unfolds the electronic device from the support state to the unfolded state, content of the application interface displayed on screen A and screen B is displayed on the display screen 231 in the unfolded state. For example, display of the content changes from FIG. 8B and FIG. 8C to FIG. 8A, or changes from FIG. 8E and FIG. 8F to FIG. 8D.

Example 4

When the display screen 231 is in the split-screen display state, the user folds the electronic device from the unfolded state to the support state (that is, screen A and screen B are rotated away from each other). When an included angle θ between screen A and screen B in the support state meets the first angle range, content of one application interface is displayed on screen A, and content of another application interface is displayed on screen B.

Figure 9A:
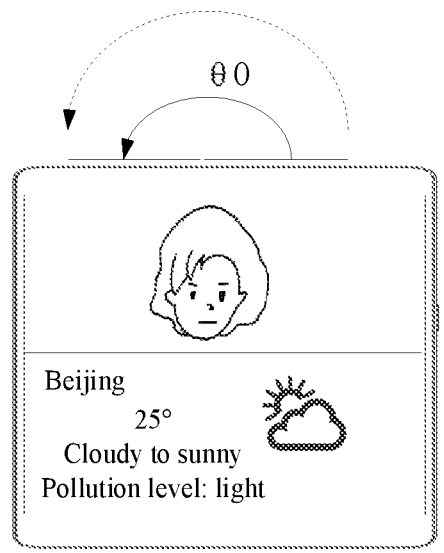
FIGS. 9A, 9B, 9C, 9D, 9E, and 9F are schematic diagrams of an angle change trend in another folding scenario according to an embodiment of this disclosure.
Figure 9B:
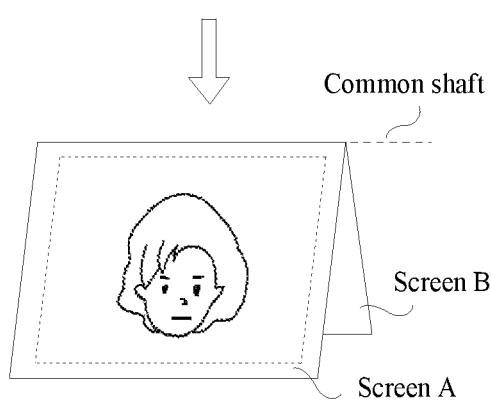
Figure 9C:
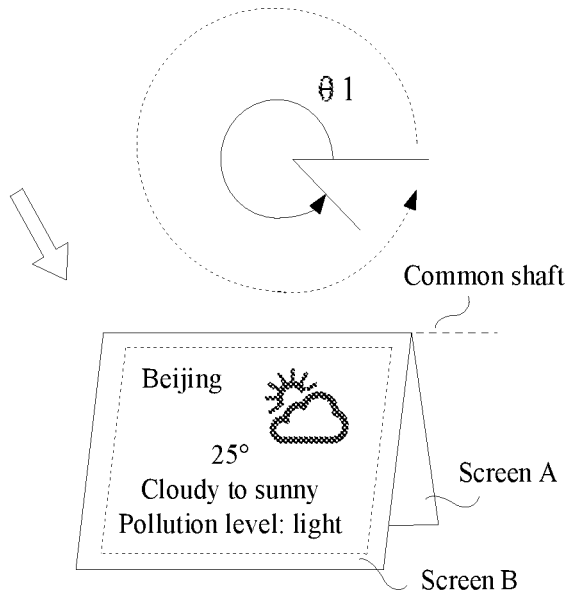

For example, when the user horizontally folds the electronic device outward from the unfolded state shown in FIG. 9A to the support state shown in FIG. 9B, a face image of the Gallery application is displayed on screen A, and weather content of the Weather application is displayed on screen B, as shown in FIG. 9B and FIG. 9C. In the support state shown in FIG. 9B, an included angle θ between screen A and screen B is θ1.

Figure 9D:
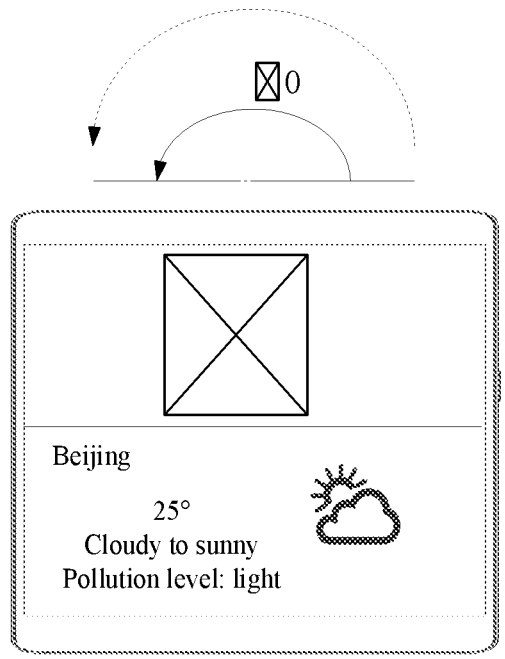
Figure 9E:
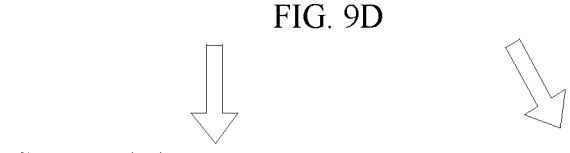
Figure 9E:
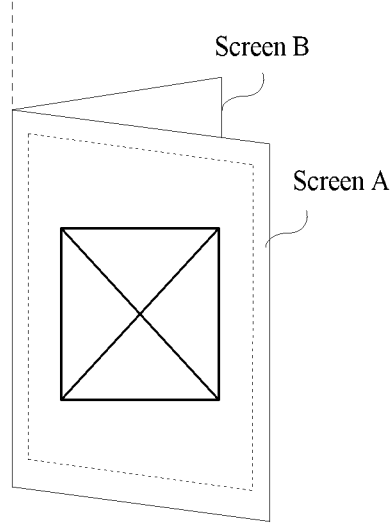
Figure 9F:
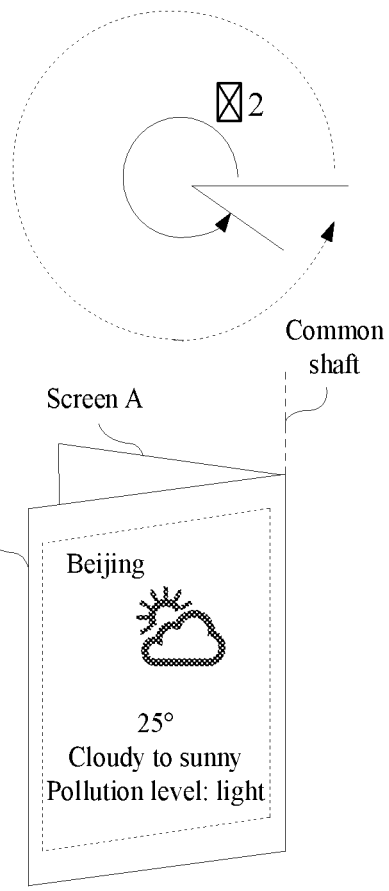

For example, when the user horizontally folds the electronic device outward from the unfolded state shown in FIG. 9D to the support state shown in FIG. 9E, a face image of the Gallery application is displayed on screen A, and weather content of the Weather application is displayed on screen B, as shown in FIG. 9E and FIG. 9F. In the support state shown in FIG. 9E, an included angle θ between screen A and screen B is θ2.

It may be understood that, when the user unfolds the electronic device from the support state to the unfolded state, content of the application interfaces displayed on screen A and screen B is displayed on the display screen 231 in the fully unfolded state. For example, display of the content changes from FIG. 9B and FIG. 9C to FIG. 9A, or changes from FIG. 9E and FIG. 9F to FIG. 9D.

Example 5

When the user folds the electronic device outward from the unfolded state to the support state (that is, screen A and screen B are rotated away from each other), and an included angle θ between screen A and screen B in the support state meets a third angle range, the display screen 231 keeps content of the currently displayed application interface unchanged. That is, screen A and screen B jointly display the content of the application interface. A specific value of the third angle range may be obtained according to experience. For example, the second angle range is [180 degrees, 190 degrees]. In this scenario, the state of the foldable screen is close to the unfolded state. In this case, the support state in this example may be understood as close to the unfolded state.

Figure 10A:
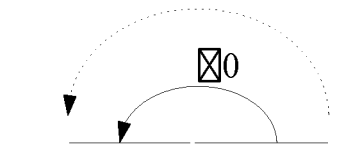
FIGS. 10A, 10B, 10C, and 10D are schematic diagrams of an angle change trend in another folding scenario according to an embodiment of this disclosure.
Figure 10A:
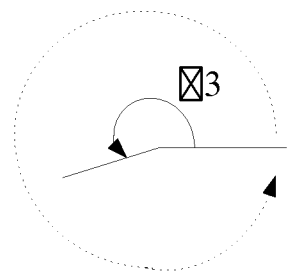
Figure 10A:
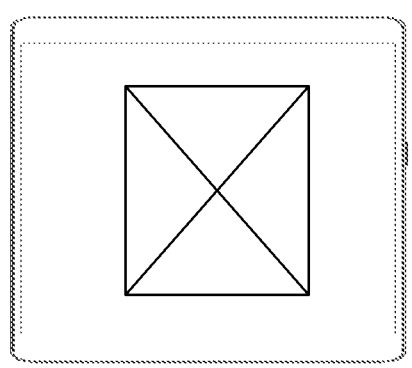

For example, in the single-application display state, when the user folds the electronic device outward from the unfolded state shown in FIG. 10A to the support state shown in FIG. 10AB, a face image of the Gallery application is displayed on screen A and screen B together. In the support state shown in FIG. 10B, an included angle θ between screen A and screen B is θ3 (for example, θ3 is 185 degrees).

It may be understood that when the user unfolds the electronic device from the support state to the unfolded state, the display screen 231 keeps the content of the currently displayed application interface unchanged.

Example 6

When the user folds the electronic device outward to the folded state (that is, screen A and screen B are rotated away from each other), and an included angle θ between screen A and screen B in the folded state meets a second angle range, screen A or screen B displays content of an application interface.

Figure 10B:
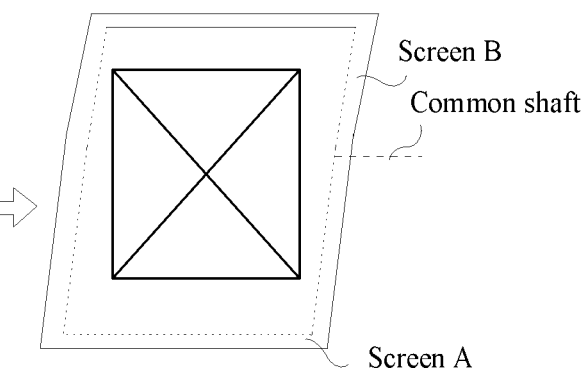
Figure 10C:
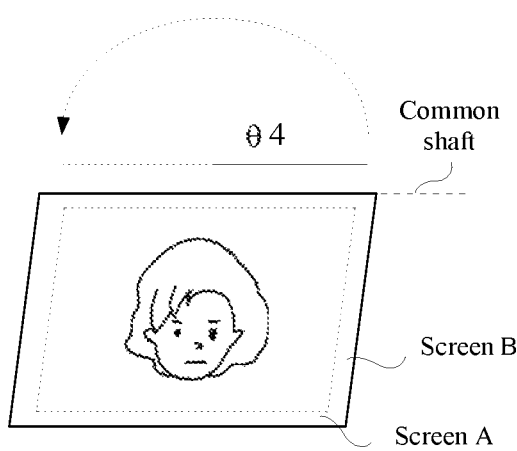

For example, in the single-application display state, a face image of the Gallery application is displayed on screen A shown in FIG. 10C. An included angle θ between screen A and screen B shown in FIG. 10C is θ4 (for example, θ4 is 180 degrees).

Figure 10D:
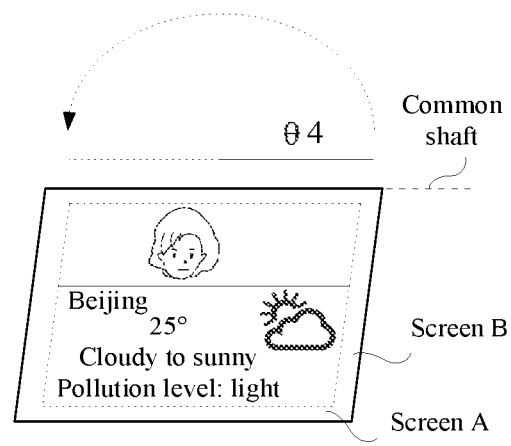

For example, in the split-screen display state, the face image of the Gallery application and weather content of the Weather application are displayed on screen A shown in FIG. 10D. The included angle θ between screen A and screen B shown in FIG. 10D is θ4.

It may be understood that when the user unfolds the electronic device from the folded state to the unfolded state, content of one application interface displayed on screen A and screen B is displayed on the display screen 231 in the unfolded state.

Example 7

When the user folds the electronic device inward from the unfolded state to the support state (that is, screen A and screen B are rotated toward each other), and an included angle θ between screen A and screen B in the support state meets a third angle range, content of an application interface is displayed on screen A or screen B. A specific value of the third angle range may be obtained according to experience. For example, the third angle range is [30 degrees, 170 degrees]. In this scenario, the state of the foldable screen is close to the unfolded state. In this case, the support state in this example may be understood as close to the unfolded state.

Figure 11A:
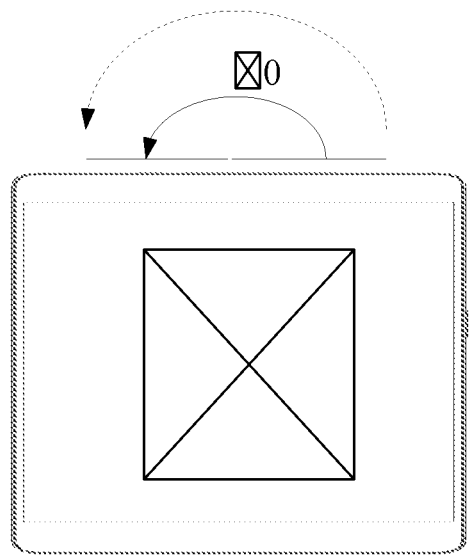
FIGS. 11A, 11B, 11C, and 11D are schematic diagrams of an angle change trend in another folding scenario according to an embodiment of this disclosure.
Figure 11B:
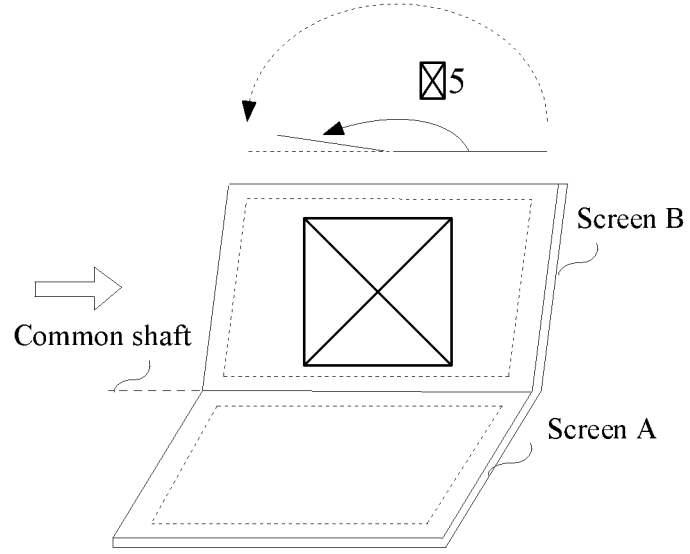

For example, in the single-application display state, when the user horizontally folds the electronic device outward from the unfolded state shown in FIG. 11A to the support state shown in FIG. 11B, a face image of the Gallery application is displayed on screen A. In the support state shown in FIG. 11B, an included angle θ between screen A and screen B is θ5 (for example, θ5 is 130 degrees).

It may be understood that, when the user unfolds the electronic device from the support state to the unfolded state, content of the application interface displayed on screen A and screen B is displayed on the display screen 231 in the unfolded state. For example, display of the content changes from FIG. 11B to FIG. 11A.

Example 8

When the user folds the electronic device inward from the unfolded state to the support state (that is, screen A and screen B are rotated toward each other), and an included angle θ between screen A and screen B in the support state meets a third angle range, the display screen 231 keeps content of the currently displayed application interface unchanged. That is, screen A and screen B jointly display the content of the application interface. A specific value of the fourth angle range may be obtained according to experience. For example, the second angle range is [170 degrees, 180 degrees]. In this scenario, the state of the foldable screen is close to the unfolded state. In this case, the support state in this example may be understood as close to the unfolded state.

Figure 11C:
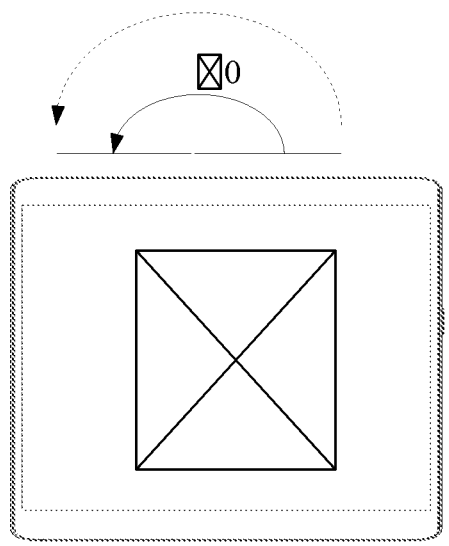
Figure 11D:
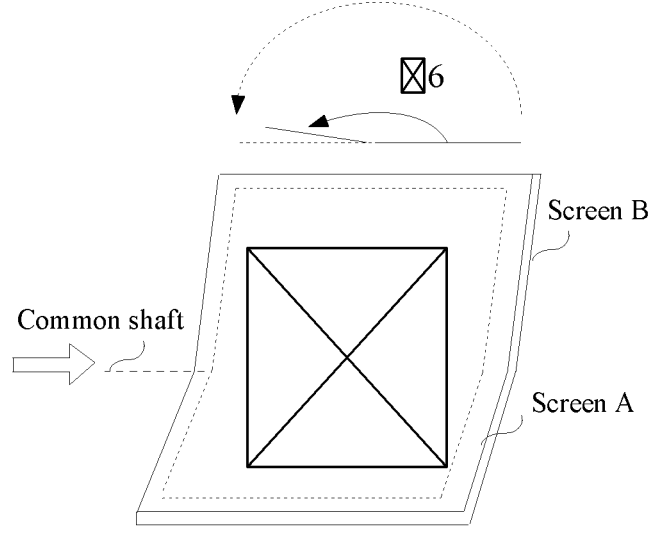

For example, in the single-application display state, when the user folds the electronic device inward from the unfolded state shown in FIG. 11C to the support state shown in FIG. 11D, a face image of the Gallery application is displayed on screen A and screen B together. In the support state shown in FIG. 11D, an included angle θ between screen A and screen B is θ6 (for example, θ6 is 175 degrees).

It may be understood that, when the user unfolds the electronic device from the support state to the unfolded state, content of the application interface displayed on screen A and screen B is displayed on the display screen 231 in the unfolded state. For example, display of the content changes from FIG. 11D to FIG. 11C.

Example 9

When the user folds the electronic device inward to the folded state (that is, screen A and screen B are rotated toward each other), and an included angle θ between screen A and screen B in the fully folded state meets a second angle range, the display screen 231 is off, that is, screen A and screen B display no content.

Figure 12:
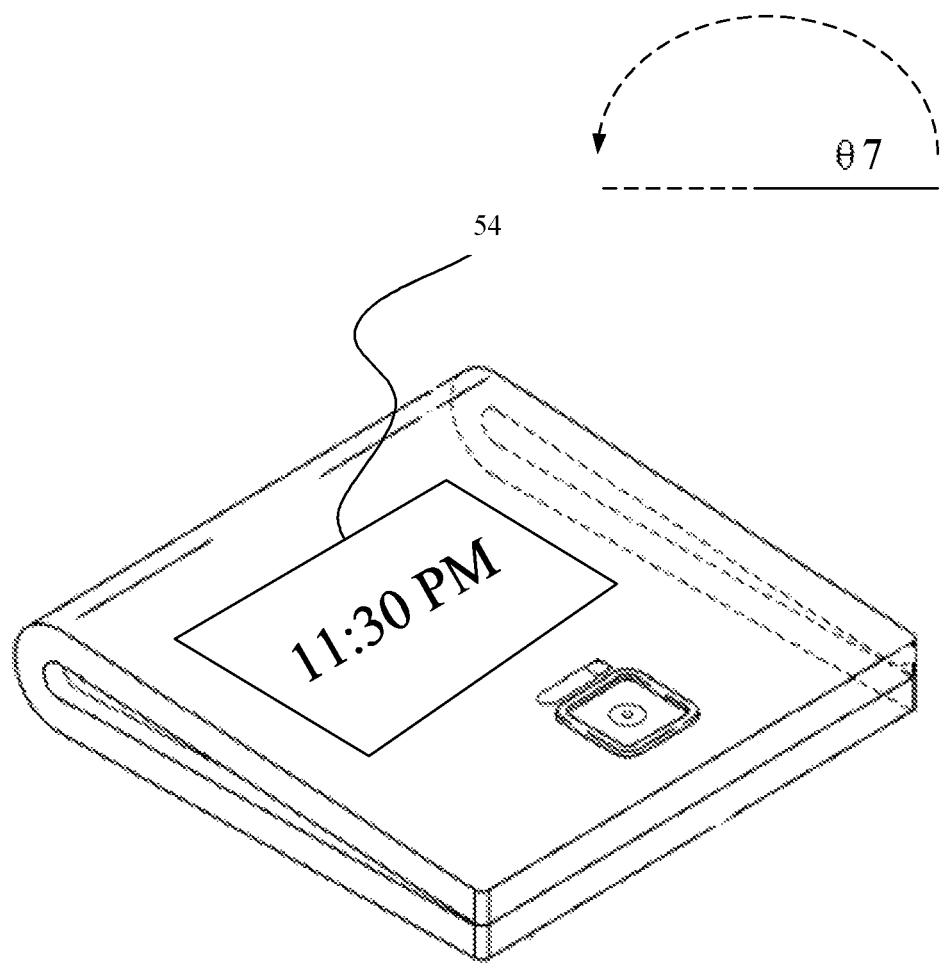
FIG. 12 is a schematic diagram of a folding scenario according to an embodiment of this disclosure.

In a possible embodiment, the display screen 231 applicable to this disclosure may have a small screen 54 shown in FIG. 12. When the electronic device is completely folded, the small screen 54 may be used for display of time or an unread message, and certainly may alternatively be used to display content of an application interface.

For example, time information is displayed on the small screen 54 shown in FIG. 12, and an included angle θ between screen A and screen B in the folded state shown in FIG. 12 is θ7 (for example, θ7 is 0 degrees).

Example 10

The display screen 231 is a curlable display screen. The user performs a folding operation (or a curling operation) on the electronic device in the unfolded state. When the display screen 231 is in landscape mode, and the curlable display screen is curled up to a half-unfolded state, the right edge of the display screen 231 displays a part of content of an application interface.

Figure 13A:
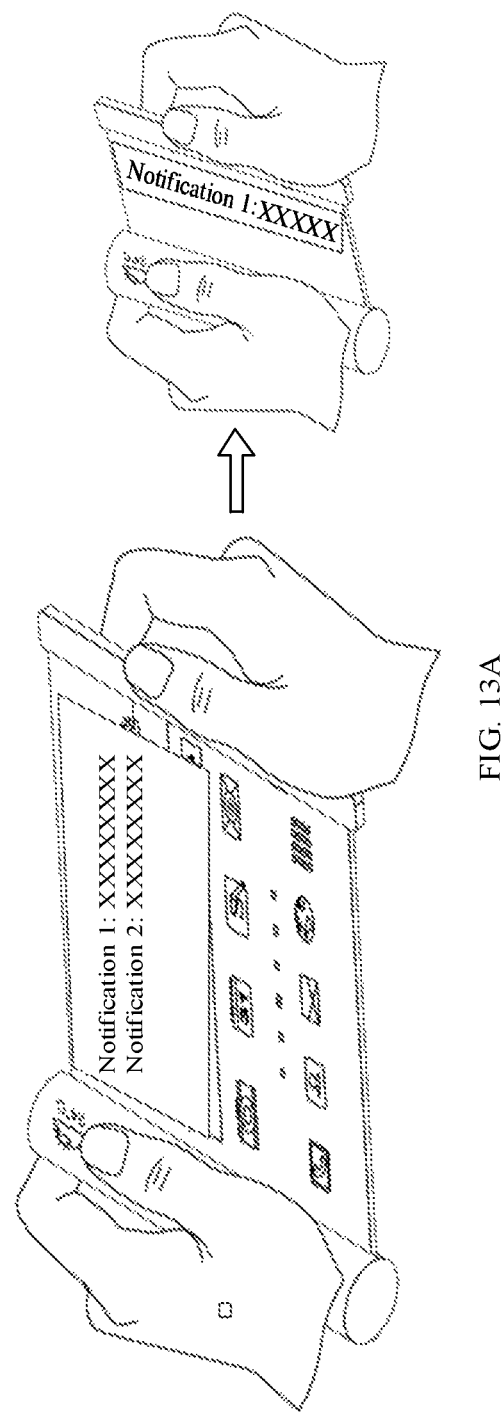
FIGS. 13A, 13B, 13C, and 13D are schematic diagrams of an angle change trend in another folding scenario according to an embodiment of this disclosure.

For example, as shown in FIG. 13A, the display screen 231 displays application icons of a home screen and notification messages in the unfolded state. When the display screen 231 is curled up to the half-unfolded state, the right edge of the display screen 231 displays a notification message.

In a possible embodiment, when a quantity of messages exceeds one, other messages are arranged and displayed from the edge to an inner side in a sequence of receiving time.

Example 11

The display screen 231 is a curlable display screen. The user performs a folding operation (or a curling operation) on the electronic device in the unfolded state. When the display screen 231 is in portrait mode, and the curlable display screen is curled up to a half-unfolded state, the bottom edge of the display screen 231 displays a part of content of an application interface.

Figure 13B:
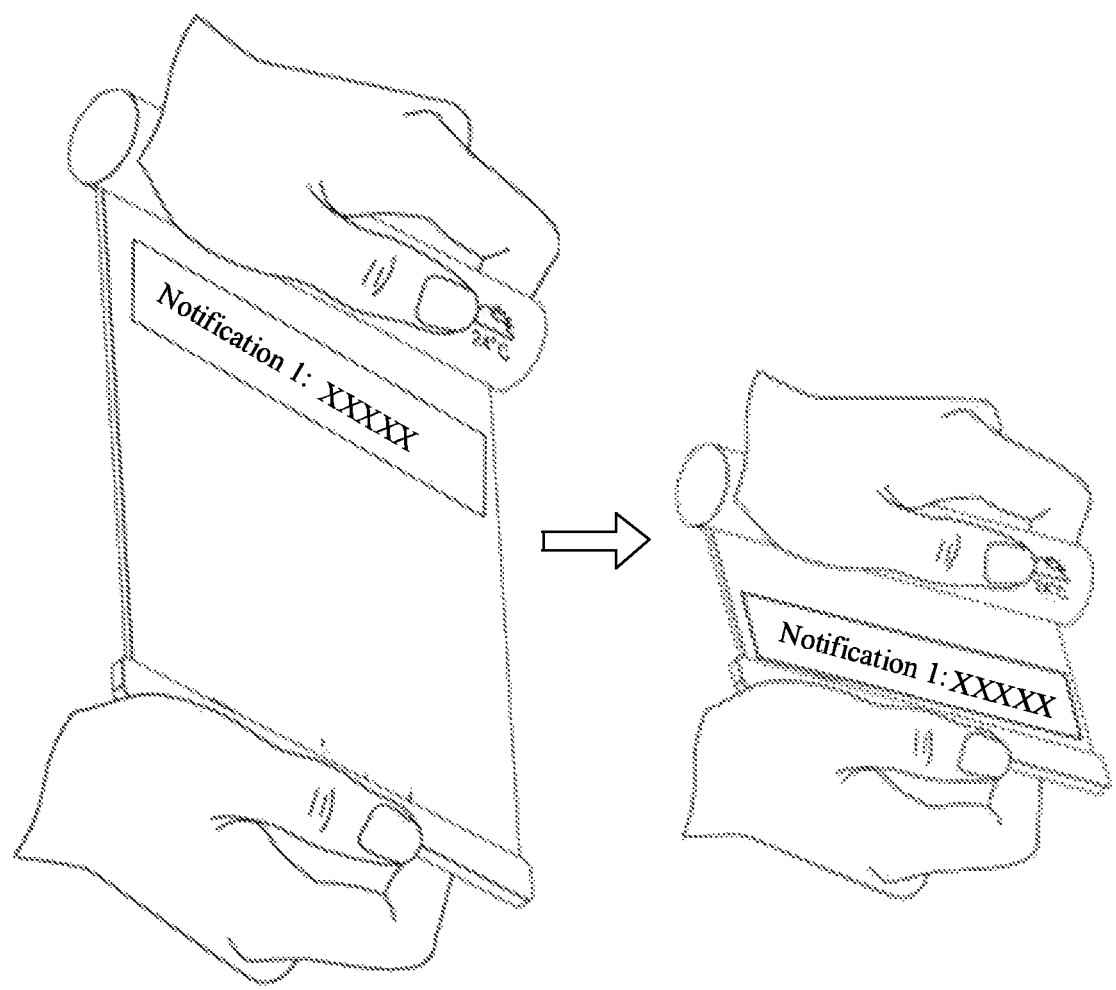

For example, as shown in FIG. 13B, the display screen 231 displays a notification message in the unfolded state. When the display screen 231 is curled up to the half-unfolded state, the bottom edge of the display screen 231 displays the notification message.

In a possible embodiment, when a quantity of messages exceeds one, other messages are arranged and displayed from the edge to an inner side in a sequence of receiving time.

Example 12

When the curlable display screen is completely curled, the display screen 231 is off.

Figure 13C:
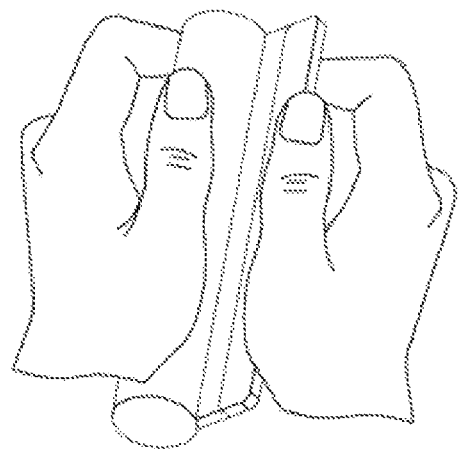

For example, as shown in FIG. 13C, when the display screen 231 is completely curled in landscape mode, the display screen 231 is off.

Figure 13D:
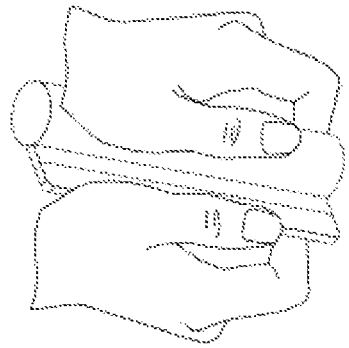

For example, as shown in FIG. 13D, when the display screen 231 is completely curled in portrait mode, the display screen 231 is off.

Figure 14:
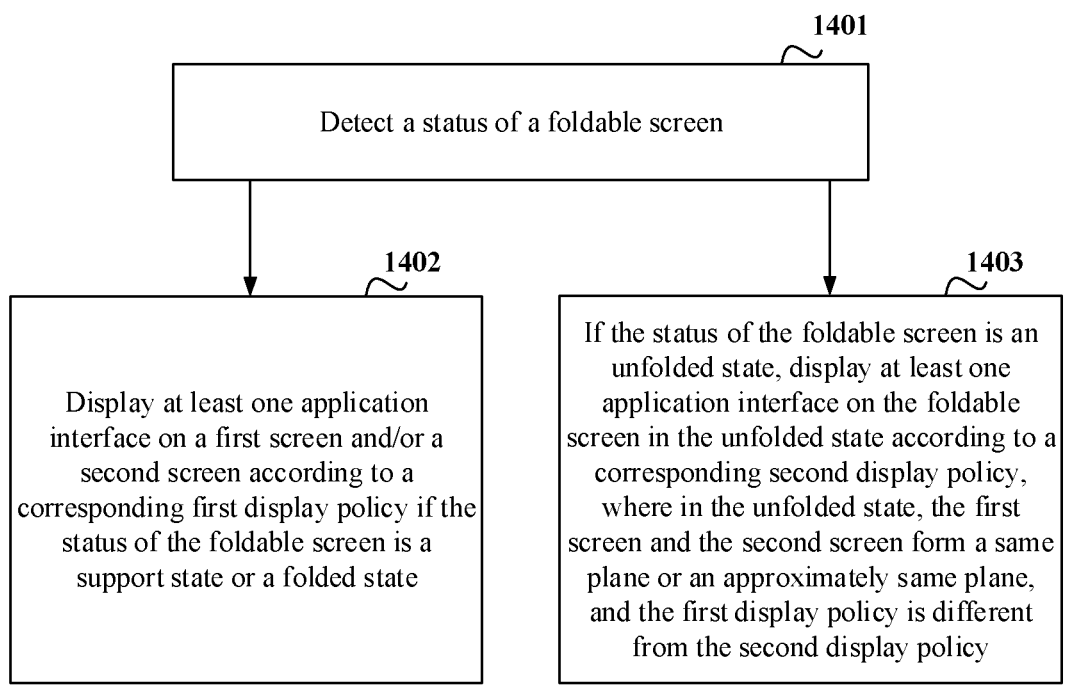
FIG. 14 is a schematic flowchart of a display method for a device having a foldable screen according to an embodiment of this disclosure.

Based on FIG. 2 to FIGS. 13C and 13D, the embodiments of this disclosure provide a display method for a device having a foldable screen. As shown in FIG. 14, the method is applicable to the foregoing device having a foldable screen, and the foldable screen includes a first screen and a second screen.

Optionally, the foldable screen may further include a bendable area, and the bendable area connects the first screen and the second screen.

Step 1401: A processor 210 in the foldable screen device detects a status of the foldable screen.

The foldable screen displays at least one application interface. The application interface is an application-related interface, and the application interface includes at least one of the following: a system preinstalled application interface, a third-party application interface, an application icon interface, an interface displayed after an application is opened, a notification message interface, and the like. The foldable screen may be understood as the display screen 231.

Optionally, a user may adjust the status of the foldable screen by performing a first operation. The processor 210 may receive the first operation of the user. The first operation may be a folding operation or an unfolding operation performed by the user on the foldable screen. For example, the first operation may be understood as an operation of applying force to the foldable screen device to fold the foldable screen, or the first operation may be understood as an operation of applying force to the foldable screen device to unfold the foldable screen.

For example, the processor 210 detects the status of the foldable screen based on an included angle between the first screen and the second screen that is collected by a sensor 232.

Optionally, the foldable screen device may have the same quantity of sensors 232 as screens obtained after folding. Each sensor 232 is configured to collect spatial representation information of a corresponding screen. Types of the different sensors 232 may be the same. An installation position of the sensor 232 in the foldable screen device is not limited. For example, a first sensor and a second sensor are disposed in the foldable screen device 200. The first sensor is configured to collect first spatial representation information of the first screen (or screen A), and the second sensor is configured to collect second spatial representation information of the second screen (or screen B). For example, the first sensor and the second sensor may be acceleration sensors, the first spatial representation information collected by the first sensor is first acceleration information, and the second spatial representation information collected by the second sensor is second acceleration information.

The acceleration information may include acceleration data of the foldable screen device in all directions, and is generally acceleration data on three axes: an x-axis direction, a y-axis direction, and a z-axis direction. For example, the first acceleration data may be acceleration data of the first screen on the three axes, and the second acceleration data may be acceleration data of the second screen on the three axes. The x, y, and z axes may be a coordinate system of the foldable screen device 200, or may be a three-dimensional coordinate system in a world coordinate system. The world coordinate system is a coordinate system of three-dimensional space and establishes a reference system required for describing another coordinate system, that is, the world coordinate system can be used to describe positions of all other coordinate systems or objects.

The processor 210 calculates the included angle between the first screen and the second screen based on the first spatial representation information of the first screen and the second spatial representation information of the second screen. Optionally, the processor 210 may further determine spatial information of the first screen and the second screen based on the first spatial representation information of the first screen and the second spatial representation information of the second screen. The spatial information includes information about the first screen and the second screen that are rotated away from each other (an outward fold posture) and information about the first screen and the second screen that are rotated toward each other (an inward fold posture).

For example, the processor 210 determines first three-dimensional coordinates of the first screen based on the first acceleration data in the directions of the x, y, and z axes, determines second three-dimensional coordinates of the second screen based on the second acceleration data in the directions of the x, y, and z axes, and then determines the spatial information and the included angle between the first screen and the second screen based on the first three-dimensional coordinates and the second three-dimensional coordinates.

In a process of determining the spatial information and the included angle information of the two screens based on the first three-dimensional coordinates and the second three-dimensional coordinates, the processor 210 may consider the first three-dimensional coordinates of the first screen as a vector a, and consider the second three-dimensional coordinates of the second screen as a vector b. For a process of calculating a first included angle between the two screens, refer to a process of calculating an included angle between the two three-dimensional vectors. To be specific, the included angle between the vector a and the vector b is the first included angle between the first screen and the second screen. In addition, the processor 210 may determine the spatial information of the first screen and the second screen based on whether the first included angle is positive or negative. For example, if the first included angle is a positive number, it may be determined that the spatial information of the first screen and the second screen is an inward fold posture. If the first included angle is a negative number, it may be determined that the spatial information of the first screen and the second screen is an outward fold posture.

Optionally, the processor 210 in the foldable screen device determines a target fold status of the foldable screen based on the spatial information and the included angle information of the first screen and the second screen, and a stored first correspondence between spatial information and included angle information of every two screens and a fold status.

A program instruction that is stored in a memory and used to recognize the status of the foldable screen may further store a first correspondence between an included angle between every two screens and a status of the foldable screen.

For example, the detecting a status of the foldable screen includes: if the included angle between the first screen and the second screen falls within a preset first angle range, determining that the status of the foldable screen is a support state, where the first angle range includes angles greater than a preset first angle threshold and less than 180 degrees, and/or angles greater than 180 degrees and less than or equal to a preset second angle threshold; or if the included angle between the first screen and the second screen falls within a preset second angle range, determining that the status of the foldable screen is a folded state, where the second angle range includes angles greater than or equal to 0 degrees and less than or equal to the first angle threshold, and/or angles greater than the preset second angle threshold and less than or equal to 360 degrees; or if the included angle between the first screen and the second screen is 180 degrees, determining that the status of the foldable screen is an unfolded state.

For another example, when the foldable screen is in an outward fold posture, a first angle range to which the included angle between the first screen and the second screen (or a first included angle) belongs may be [A0, A1]. The processor 210 determines that the status of the foldable screen is a dual-support state. The included angle between the screens obtained after folding is not less than A0 and not greater than A1. Values of A0 and A1 may be set based on the fold status and then stored. The values of A0 and A1 are not limited herein. Optionally, in the dual-support state, it is assumed that a second included angle between a common shaft of the first screen and the second screen and a reference plane approaches a preset first angle, that is, a difference between the second included angle and the preset first angle does not exceed a preset first angle difference. The preset first angle may be 0 degrees and/or 90 degrees.

If the second included angle is close to 0 degrees, the processor 210 determines that the common shaft is parallel to the reference plane. In this case, the first fold status may further include a horizontal dual-support state. If the second included angle is close to 90 degrees, the processor 210 determines that the common shaft is perpendicular to the reference plane. In this case, the first fold status may further include a vertical dual-support state.

When the foldable screen is in an inward fold posture, a first angle range to which the included angle between the first screen and the second screen (or a first included angle) belongs may be [B0, B1]. The processor 210 determines that the status of the foldable screen is a single-support state. The second angle range indicates that the included angle between the screens obtained after folding is not less than B0 and not greater than B1. Values of B0 and B1 may be set based on the fold status and then stored. The values of B0 and B1 are not limited herein. Optionally, in the single-support state, it is assumed that a third included angle between the common shaft of the first screen and the second screen and the reference plane approaches a preset second angle, that is, a difference between the third included angle and the preset second angle does not exceed a preset second angle difference. The preset second angle may be 0 degrees.

If a plane on which the first screen is located is parallel to the reference plane, the second fold status may further include a single-support state in which screen A serves as the support. If a plane on which the second screen is located is parallel to the reference plane, the second fold status may further include a single-support state in which screen B serves as the support.

Optionally, the processor 210 may further encapsulate the status of the foldable screen, so as to obtain the current status of the foldable screen, and then perform content display based on the current status of the foldable screen.

The following process of encapsulating the status of the foldable screen is described by using the support state (including the dual-support state and the single-support state) of the foldable screen as an example. It may be understood that the process of encapsulating the status of the foldable screen should also be applicable to other states, and details are not described herein again.

For example, encapsulation may be performed in the following two manners.

Manner 1: Each support state is encapsulated by using a preset state value corresponding to each support state:
  State 1: The state value is key=0, and the support state is the horizontal dual-support state;
  State 2: The state value is key=1, and the support state is the vertical dual-support state;
  State 3: The state value is key=2, and the support state is the single-support state in which screen A serves as the support; and
  State 4: The state value is key=3, and the support state is the single-support state in which screen B serves as the support.

Manner 2: Encapsulation is performed by using a state value with a parameter:
  State 1: state value=dual-support state (horizontal direction/vertical direction), where the parameter is horizontal or vertical; and
  State 2: state value=single-support state (screen A serving as the support/screen B serving as the support), where the parameter is screen A serving as the support or screen B serving as the support.

In a possible embodiment, an application may actively obtain the current status of the display screen 231. The processor 210 may provide an application programming interface (API) used to obtain a fold status, for example, a getStatus interface. A return value of the API used to obtain the status may be a state value encapsulated in the foregoing Manner 1 and Manner 2.

The application may actively obtain the current status of the display screen 231 through the API.

In another possible embodiment, an application may passively receive the current status of the display screen 231. By using the broadcast and registration callback mechanism, the application passively receives the current status of the display screen 231. An application that has a requirement for obtaining the current status of the display screen 231 may perform broadcast registration (whether an application has the requirement for obtaining the current status of the display screen may be selected by the user). After determining the status of the display screen 231, the processor 210 broadcasts the determined status to a registered application, so that the application passively receives the current status of the display screen 231.

Information about the registered application may be stored in the memory of the foldable screen device.

Optionally, the processor 210 in the foldable screen device determines a display policy of the status of the foldable screen based on the status of the foldable screen and a stored second correspondence between a status of the foldable screen and a display policy, so as to display an application interface.

For example, if the status of the foldable screen is the support state or the folded state, a corresponding display policy is a first display policy. If the status of the foldable screen is the unfolded state, a corresponding display policy is a second display policy.

Step 1402: The processor 210 in the foldable screen device displays at least one application interface on the first screen and/or the second screen according to the corresponding first display policy if the status of the foldable screen is the support state or the folded state.

In this step, the displaying at least one application interface on the first screen and/or the second screen according to the corresponding first display policy if the status of the foldable screen is the support state or the folded state includes: if the at least one application interface includes a first application interface, displaying one part of the first application interface on the first screen, and displaying the other part of the first application interface on the second screen, for example, as shown in FIG. 10B and FIG. 11D; or if the at least one application interface includes a first application interface, displaying the first application interface on one of the first screen and the second screen, for example, as shown in FIG. 6B, FIG. 6D, FIG. 7B, FIG. 7D, and FIG. 11B; or if the at least one application interface includes a first application interface, displaying the first application interface on the first screen, and displaying the first application interface on the second screen, for example, as shown in FIG. 8B and FIG. 8E; or if the at least one application interface includes a first application interface and a second application interface, displaying the first application interface on the first screen, and displaying the second application interface on the second screen, for example, as shown in FIG. 9B and FIG. 9E; or if the at least one application interface includes a first application interface and a second application interface, displaying the first application interface and the second application interface on one of the first screen and the second screen, for example, as shown in FIG. 10D.

For example, if the at least one application interface includes the first application interface, the displaying the first application interface on one of the first screen and the second screen includes: when the first screen and the second screen are rotated away from each other, determining, based on an image captured by a camera, that the first screen is a screen being watched by a user, and displaying the first application interface on the first screen; or determining, based on an image captured by the camera, that the second screen is a screen being watched by the user, and displaying the first application interface on the second screen; or when the first screen and the second screen are rotated away from each other, if it is determined, based on a quantity of first contact points between a finger of the user and the first screen and a quantity of second contact points between a finger of the user and the second screen, that the quantity of first contact points is less than or equal to the quantity of second contact points, displaying the first application interface on the first screen; or if it is determined that the quantity of first contact points is greater than the quantity of second contact points, displaying the first application interface on the second screen; or when the first screen and the second screen are rotated away from each other, if it is determined, based on a first contact area between a finger of the user and the first screen and a second contact area between a finger of the user and the second screen, that the first contact area is less than or equal to the second contact area, displaying the first application interface on the first screen; or if it is determined that the first contact area is greater than the second contact area, displaying the first application interface on the second screen.

For example, if the at least one application interface includes the first application interface, the displaying the first application interface on one of the first screen and the second screen includes: when the first screen and the second screen are rotated toward each other, displaying the first application interface on the second screen if a plane on which the first screen is located is parallel to a reference plane; or when the first screen and the second screen are rotated toward each other, displaying the first application interface on the first screen if a plane on which the second screen is located is parallel to the reference plane; or when the first screen and the second screen are rotated toward each other, determining, based on an image captured by a camera, that the first screen is a screen being watched by a user, and displaying the first application interface on the first screen; or determining, based on an image captured by the camera, that the second screen is a screen being watched by the user, and displaying the first application interface on the second screen.

If the at least one application interface includes the first application interface and the second application interface, displaying the first application interface on one of the first screen and the second screen, and displaying the second application interface on the other screen of the first screen and the second screen include: when the first screen and the second screen are rotated away from each other, if it is determined that the first application interface is an application interface being operated, and it is determined, based on an image captured by a camera, that the first screen is a screen facing an owner user, displaying the first application interface on the first screen, and displaying the second application interface on the second screen; or if it is determined that the second screen is a screen facing the owner user, displaying the first application interface on the second screen, and displaying the second application interface on the first screen; or when the first screen and the second screen are rotated away from each other, if it is determined that the second application interface is an application interface being operated, and it is determined, based on an image captured by the camera, that the first screen is a screen facing the owner user, displaying the second application interface on the first screen, and displaying the first application interface on the second screen; or if it is determined that the second screen is a screen facing the owner user, displaying the second application interface on the second screen, and displaying the first application interface on the first screen; or when the first screen and the second screen are rotated away from each other, if it is determined that the first application interface is an application interface being operated, and if it is determined, based on a quantity of first contact points between a finger of the user and the first screen and a quantity of second contact points between a finger of the user and the second screen, that the quantity of first contact points is less than or equal to the quantity of second contact points, displaying the first application on the first screen, and displaying the second application interface on the second screen; or if it is determined that the quantity of first contact points is greater than the quantity of second contact points, displaying the first application interface on the second screen, and displaying the second application interface on the first screen; or when the first screen and the second screen are rotated away from each other, if it is determined that the second application interface is an application interface being operated, and if it is determined, based on a quantity of first contact points between a finger of the user and the first screen and a quantity of second contact points between a finger of the user and the second screen, that the quantity of first contact points is less than or equal to the quantity of second contact points, displaying the second application on the first screen, and displaying the first application interface on the second screen; or if it is determined that the quantity of first contact points is greater than the quantity of second contact points, displaying the first application interface on the second screen, and displaying the second application interface on the first screen; or when the first screen and the second screen are rotated away from each other, if it is determined that the first application interface is an application interface being operated, and if it is determined, based on a first contact area between a finger of the user and the first screen and a second contact area between a finger of the user and the second screen, that the first contact area is less than or equal to the second contact area, displaying the first application on the first screen, and displaying the second application interface on the second screen; or if it is determined that the first contact area is greater than the second contact area, displaying the first application interface on the second screen, and displaying the second application interface on the first screen; or when the first screen and the second screen are rotated away from each other, if it is determined that the second application interface is an application interface being operated, and if it is determined, based on a first contact area between a finger of the user and the first screen and a second contact area between a finger of the user and the second screen, that the first contact area is less than or equal to the second contact area, displaying the second application on the first screen, and displaying the first application interface on the second screen; or if it is determined that the first contact area is greater than the second contact area, displaying the first application interface on the second screen, and displaying the second application interface on the first screen.

For another example, if the at least one application interface includes the first application interface and the second application interface, displaying the first application interface on one of the first screen and the second screen, and displaying the second application interface on the other screen of the first screen and the second screen include: when the first screen and the second screen are rotated toward each other, if it is determined that the first application interface is an application interface being operated and a plane on which the first screen is located is parallel to a reference plane, displaying the first application interface on the second screen, and displaying the second application interface on the first screen; or when the first screen and the second screen are rotated toward each other, if it is determined that the second application interface is an application interface being operated and a plane on which the first screen is located is parallel to the reference plane, displaying the second application interface on the second screen, and displaying the first application interface on the first screen; or when the first screen and the second screen are rotated toward each other, if it is determined that the first application interface is an application interface being operated and a plane on which the second screen is located is parallel to the reference plane, displaying the first application interface on the first screen, and displaying the second application interface on the second screen; or when the first screen and the second screen are rotated toward each other, if it is determined that the first application interface is an application interface being operated and a plane on which the second screen is located is parallel to the reference plane, displaying the second application interface on the first screen, and displaying the first application interface on the second screen.

Optionally, when the first screen and the second screen are rotated toward each other and the status of the foldable screen is the folded state, the first screen and the second screen may be turned off, thereby reducing power consumption of the foldable screen device.

Displaying an application interface on the first screen or the second screen includes: controlling a display direction of the application interface to be perpendicular to a bottom edge of the first screen, where the bottom edge of the first screen is an edge that is of the first screen and that is parallel to a horizontal plane when the foldable screen is in the folded state; and/or controlling the display direction of the application interface to be perpendicular to a bottom edge of the second screen, where the bottom edge of the second screen is an edge that is of the second screen and that is parallel to the horizontal plane when the foldable screen is in the folded state.

Step 1403: The processor 210 in the foldable screen device displays at least one application interface on the foldable screen in the unfolded state according to the corresponding second display policy if the status of the foldable screen is the unfolded state.

In the unfolded state, the first screen and the second screen form a same plane or form an approximately same plane. The first display policy is different from the second display policy.

In this step, displaying at least one application interface on the first screen and/or the second screen according to the second display policy corresponding to the folded state if it is detected that the status of the foldable screen is the unfolded state includes: if the at least one application interface includes a first application interface, displaying the first application interface on the foldable screen in the unfolded state, for example, as shown in FIG. 5A; or if the at least one application interface includes a first application interface and a second application interface, displaying the first application interface on the first screen in the unfolded state, and displaying the second application interface on the second screen, for example, as shown in FIG. 5; or if the at least one application interface includes the first application interface and the second application interface, displaying the first application interface and the second application interface in a stacked manner on the foldable screen in the unfolded state.

In a possible embodiment, the memory may further store preset duration. When detecting the status of the foldable screen, the processor 210 may start timing, and determine that the foldable screen reaches a corresponding state when duration that the detected status of the foldable screen lasts reaches the preset duration. Because the user controls the foldable screen to fold or unfold by using a dynamic fold/unfold operation, this can prevent the foldable screen from temporarily entering a transition state at a moment. The preset duration is not limited in this embodiment of this disclosure.

In this embodiment of this disclosure, the status of the foldable screen is detected, and an application interface is displayed according to a display policy corresponding to the status of the foldable screen. In this way, display of the application interface can be implemented in different states. Even when the user performs a folding operation on the foldable electronic device, after the display screen is folded, the user can view the application interface, and further view and use service information provided in different states of the foldable screen, so that user experience is further improved.

Figure 15:
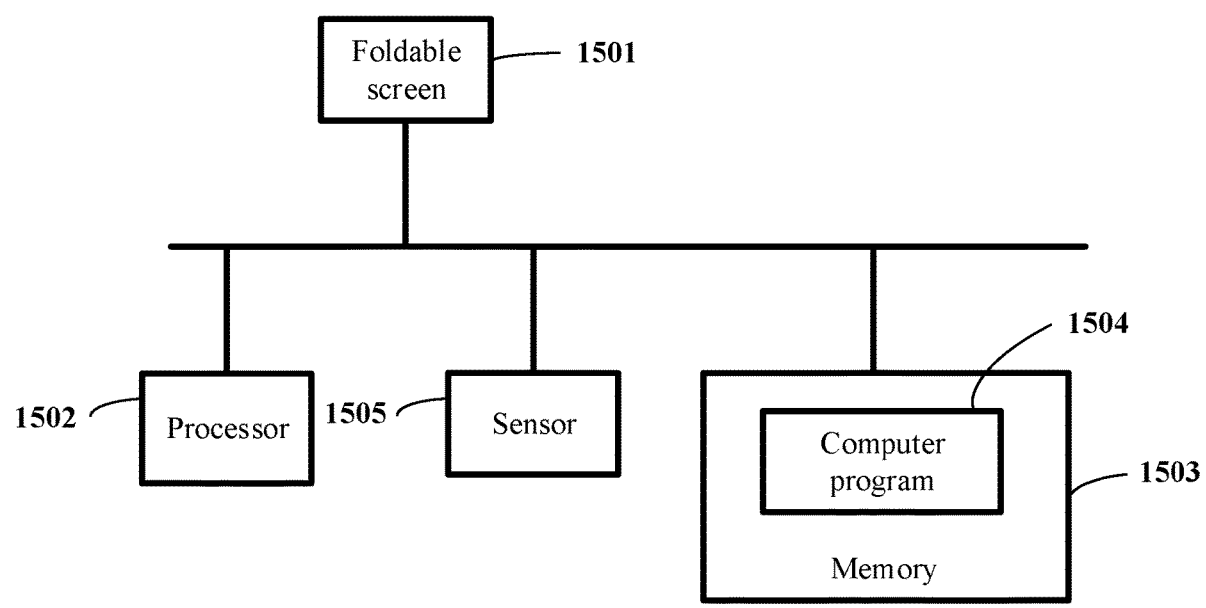
FIG. 15 is a schematic diagram of a structure of a foldable screen device according to an embodiment of this disclosure.

In some other embodiments of this disclosure, an embodiment of this disclosure discloses a foldable screen device. As shown in FIG. 15, the foldable screen device may include a foldable screen 1501, one or more processors 1502, one or more memories 1503, one or more applications (not shown), one or more computer programs 1504, a sensor 1505, and one or more communications buses 1506 that connect the foregoing components. The one or more computer programs 1504 are stored in the memory 1503 and are executed by the one or more processors 1502. The one or more computer programs 1504 include instructions, and the instructions may be used to perform the steps in the corresponding embodiment in FIG. 14.

The embodiments of this disclosure further provide a computer storage medium. The computer storage medium stores computer instructions. When the computer instructions run on a foldable screen device, the foldable screen device is enabled to perform the foregoing related method steps to implement the display method for a device having a foldable screen in the foregoing embodiment.

The embodiments of this disclosure further provide a computer program product. When the computer program product is run on a computer, the computer is enabled to perform the related steps to implement the display method for a device having a foldable screen in the foregoing embodiment.

In addition, the embodiments of this disclosure further provide an apparatus. The apparatus may be a chip, a component, or a module. The apparatus may include a processor and a memory that are connected. The memory is configured to store computer-executable instructions, and when the apparatus runs, the processor may execute the computer-executable instructions stored in the memory, so that the chip performs the display method for a device having a foldable screen in the foregoing method embodiments.

The foldable screen device, the computer storage medium, the computer program product, or the chip provided in the embodiments of this disclosure is configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that, for the purpose of convenient and brief descriptions, division into the foregoing function modules is merely used as an example for description. During actual application, the foregoing functions can be allocated to different function modules for implementation according to a requirement, in other words, an inner structure of an apparatus is divided into different function modules to implement all or some of the functions described above.

In the several embodiments provided in this disclosure, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected according to actual requirements to achieve the objectives of the solutions in the embodiments.

In addition, function units in the embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this disclosure essentially, or the part contributing to other technologies, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this disclosure. The foregoing storage medium includes: any medium that can store program code, such as a USB flash drive, a removable hard disk, a read-only memory (ROM), a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
 detecting a status of a foldable screen of a device; and
 displaying, when the status is a support state, at least one
  application interface on one or more of a first screen of the foldable screen or a second screen of the foldable screen according to a first display policy, wherein the at least one application interface comprises a first application interface and a second application interface, and wherein displaying the at least one application interface comprises:
  when the first screen and the second screen are rotated toward each other and a first plane on which the first screen is located is parallel to a reference plane:
    displaying the first application interface on the second screen; and
    displaying the second application interface on the first screen; and
  when the first screen and the second screen are rotated toward each other and a second plane on which the second screen is located is parallel to the reference plane:
    displaying the first application interface on the first screen; and
    displaying the second application interface on the second screen.

2. The method of claim 1, wherein the at least one application interface comprises at least one of a pre-installed application interface, a third-party application interface, an application icon interface, or an interface displayed after an application is opened.

3. The method of claim 1, wherein detecting the status comprises:
  detecting, when an included angle between the first screen and the second screen is within a preset first angle range, that the status is the support state, wherein the preset first angle range comprises first angles greater than a preset first angle threshold and less than 180 degrees, second angles greater than 180 degrees and less than or equal to a preset second angle threshold, or both the first angles and the second angles;
  detecting, when the included angle is within a preset second angle range, that the status is a folded state, wherein the preset second angle range comprises third angles greater than or equal to 0 degrees and less than or equal to the preset first angle threshold, fourth angles greater than the preset second angle threshold and less than or equal to 360 degrees, or both the third angles and the fourth angles; or
  detecting, when the included angle is 180 degrees, that the status is an unfolded state.

4. The method of claim 1, wherein the first application interface is an application interface being operated.

5. The method of claim 1, further comprising displaying, when the status is an unfolded state, the at least one application interface on the foldable screen in the unfolded state according to a second display policy, wherein in the unfolded state, the first screen, and the second screen form a same plane or form an approximately same plane, and wherein the first display policy is different from the second display policy.

6. The method of claim 5, further comprising:
  detecting that the status is the unfolded state;
  detecting that the at least one application interface comprises the first application interface; and
  displaying, based on the status being the unfolded state and the at least one application interface comprising the first application interface, the first application interface on the foldable screen in the unfolded state.

7. The method of claim 5, further comprising:
  detecting that the status is the unfolded state;
  detecting that the at least one application interface comprises the first application interface and the second application interface; and
  displaying, based on the status being the unfolded state and the at least one application interface comprising the first application interface and the second application interface, the first application interface on the first screen and the second application interface on the second screen.

8. The method of claim 5, further comprising:
  detecting that the status is the unfolded state;
  detecting that the at least one application interface comprises the first application interface and the second application interface; and
  displaying, based on the status being the unfolded state and the at least one application interface comprising the first application interface and the second application interface, the first application interface and the second application interface in a stacked manner on the foldable screen in the unfolded state.

9. The method of claim 1, further comprising controlling a display direction of the at least one application interface to be perpendicular to a bottom edge of the first screen, wherein the bottom edge is parallel to a horizontal plane when the foldable screen is in a folded state.

10. The method of claim 1, further comprising controlling a display direction of the at least one application interface to be perpendicular to a bottom edge of the second screen, wherein the bottom edge is an edge that is of the second screen and that is parallel to a horizontal plane when the foldable screen is in a folded state.

11. An apparatus, comprising:
  a sensor;
  a foldable screen comprising a first screen and a second screen;
  one or more memories configured to store instructions; and
  one or more processors coupled to the sensor, the foldable screen, and the one or more memories and configured to execute the instructions to cause the apparatus to:
    detect, using the sensor, a status of the foldable screen; and
    display, when the status is a support state, at least one application interface on one or more of the first screen or the second screen according to a first display policy, wherein the at least one application interface comprises a first application interface and a second application interface, and wherein displaying the at least one application interface comprises:
      when the first screen and the second screen are rotated toward each other and a first plane on which the first screen is located is parallel to a reference plane:
        displaying the first application interface on the second screen; and
        displaying the second application interface on the first screen; and
      when the first screen and the second screen are rotated toward each other and a second plane on which the second screen is located is parallel to the reference plane:
        displaying the first application interface on the first screen; and
        displaying the second application interface on the second screen.

12. The apparatus of claim 11, wherein the at least one application interface comprises at least one of a pre-installed application interface, a third-party application interface, an application icon interface, or an interface displayed after an application is opened.

13. The apparatus of claim 11, wherein the one or more processors are further configured to execute the instructions to cause the apparatus to:
   detect, when an included angle between the first screen and the second screen is within a preset first angle range, that the status is the support state, wherein the preset first angle range comprises first angles greater than a preset first angle threshold and less than 180 degrees, second angles greater than 180 degrees and less than or equal to a preset second angle threshold, or both the first angles and the second angles;
   detect, when the included angle is within a preset second angle range, that the status is a folded state, wherein the preset second angle range comprises third angles greater than or equal to 0 degrees and less than or equal to the preset first angle threshold, fourth angles greater than the preset second angle threshold and less than or equal to 360 degrees, or both the third angles and the fourth angles; or
   detect, when the included angle is 180 degrees, that the status is an unfolded state.

14. The apparatus of claim 11, wherein the one or more processors are further configured to execute the instructions to cause the apparatus to operate the first application interface.

15. The apparatus of claim 11, wherein the one or more processors are further configured to execute the instructions to cause the apparatus to display, when the status is an unfolded state, the at least one application interface on the foldable screen in the unfolded state according to a second display policy, wherein in the unfolded state, the first screen and the second screen form a same plane or form an approximately same plane, and wherein the first display policy is different from the second display policy.

16. The apparatus of claim 15, wherein the one or more processors are further configured to execute the instructions to cause the apparatus to:
   detect that the status is the unfolded state;
   detect that the at least one application interface comprises the first application interface; and
   display, based on the status being the unfolded state and the at least one application interface comprising the first application interface, the first application interface on the foldable screen in the unfolded state.

17. The apparatus of claim 15, wherein the one or more processors are further configured to execute the instructions to cause the apparatus to:
   detect that the status is the unfolded state;
   detect that the at least one application interface comprises the first application interface and the second application interface; and
   display, based on the status being the unfolded state and the at least one application interface comprising the first application interface and the second application interface, the first application interface on the first screen and the second application interface on the second screen.

18. The apparatus of claim 15, wherein the one or more processors are further configured to execute the instructions to cause the apparatus to:
   detect that the status is the unfolded state;
   detect that the at least one application interface comprises the first application interface and the second application interface; and
   display, based on the status being the unfolded state and the at least one application interface comprising the first application interface and the second application interface, the first application interface and the second application interface in a stacked manner on the foldable screen in the unfolded state.

19. The apparatus of claim 11, wherein the one or more processors are further configured to execute the instructions to cause the apparatus to control a display direction of the at least one application interface to be perpendicular to a bottom edge of the first screen, and wherein the bottom edge is parallel to a horizontal plane when the foldable screen is in a folded state.

20. A computer program product comprising instructions stored on a non-transitory computer readable medium that, when executed by one or more processors, cause an apparatus to:
   detect a status of a foldable screen of the apparatus; and
   display, when the status is a support state or a folded state, at least one application interface on one or more of a first screen of the foldable screen or a second screen of the foldable screen according to a first display policy, wherein the at least one application interface comprises a first application interface and a second application interface, and wherein displaying the at least one application interface comprises:
      when the first screen and the second screen are rotated toward each other and a first plane on which the first screen is located is parallel to a reference plane:
         displaying the first application interface on the second screen; and
         displaying the second application interface on the first screen; and
      when the first screen and the second screen are rotated toward each other and a second plane on which the second screen is located is parallel to the reference plane:
         displaying the first application interface on the first screen; and
         displaying the second application interface on the second screen.

* * * * *